United States Patent [19]

Fisher et al.

[11] Patent Number: 5,075,839
[45] Date of Patent: Dec. 24, 1991

[54] INDUCTOR SHUNT, OUTPUT VOLTAGE REGULATION SYSTEM FOR A POWER SUPPLY

[75] Inventors: Rayette A. Fisher; Sayed-Amr A. El-Hamamsy, both of Schenectady, N.Y.

[73] Assignee: General Electric Company, Schenectady, N.Y.

[21] Appl. No.: 504,820

[22] Filed: Apr. 5, 1990

[51] Int. Cl.⁵ .................... H02M 1/14; H02M 7/06
[52] U.S. Cl. ........................................ 363/48; 363/65; 363/82; 363/90
[58] Field of Search ............... 323/266; 363/47, 48, 363/65, 67, 82, 90; 307/34

[56] References Cited

U.S. PATENT DOCUMENTS

| | | | |
|---|---|---|---|
| 3,308,311 | 3/1967 | Swanson | 307/93 |
| 3,531,712 | 9/1970 | Cecchini | 323/224 |
| 3,890,557 | 6/1975 | Bogdanov. | |
| 4,628,430 | 12/1986 | Mastner | 363/48 |

FOREIGN PATENT DOCUMENTS

| | | | |
|---|---|---|---|
| 875361 | 10/1981 | U.S.S.R. | 323/282 |
| 982539 | 3/1965 | United Kingdom | 363/47 |

*Primary Examiner*—William H. Beha, Jr.
*Attorney, Agent, or Firm*—Jill M. Breedlove; James C. Davis, Jr.; Marvin Snyder

[57] ABSTRACT

High efficiency, post regulation of auxiliary outputs in multiple output-power supplies is provided by connecting a regulating switching device in parallel with a filter inductor connected in the current path from the rectifiers to the output terminal. For minimum output power for that auxiliary output, the switching device is held off at all times. When increased power is required, the switching device is turned on for a short period during each cycle of the inductor voltage. The switching system may be configured to conduct current from the output end of the inductor to the input end of the inductor or vice versa or either one selectively, in accordance with the particular regulation scheme chosen. Efficiency is maximized since current flows in the switching device for only a small portion of the cycle of the inductor voltage.

16 Claims, 19 Drawing Sheets

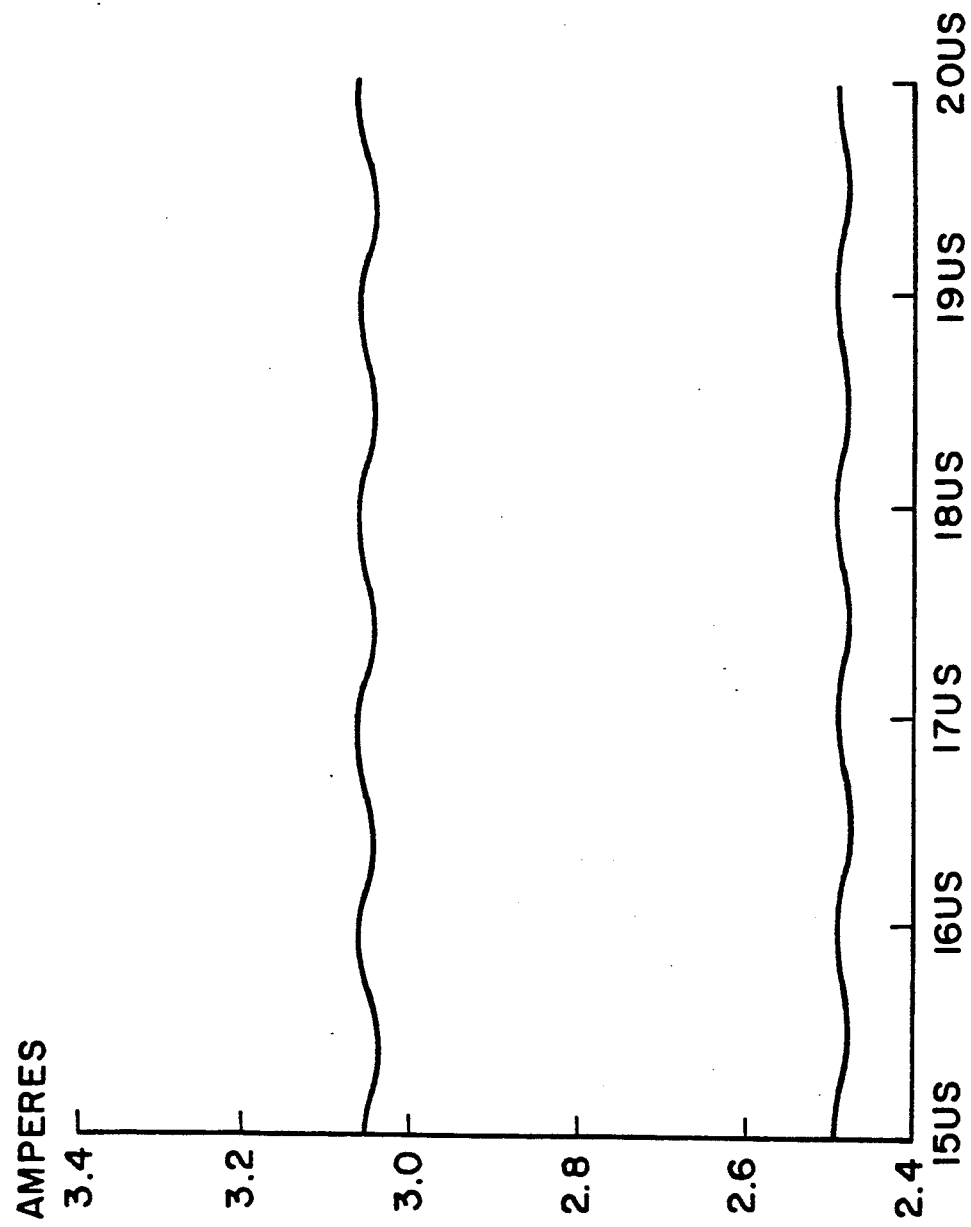

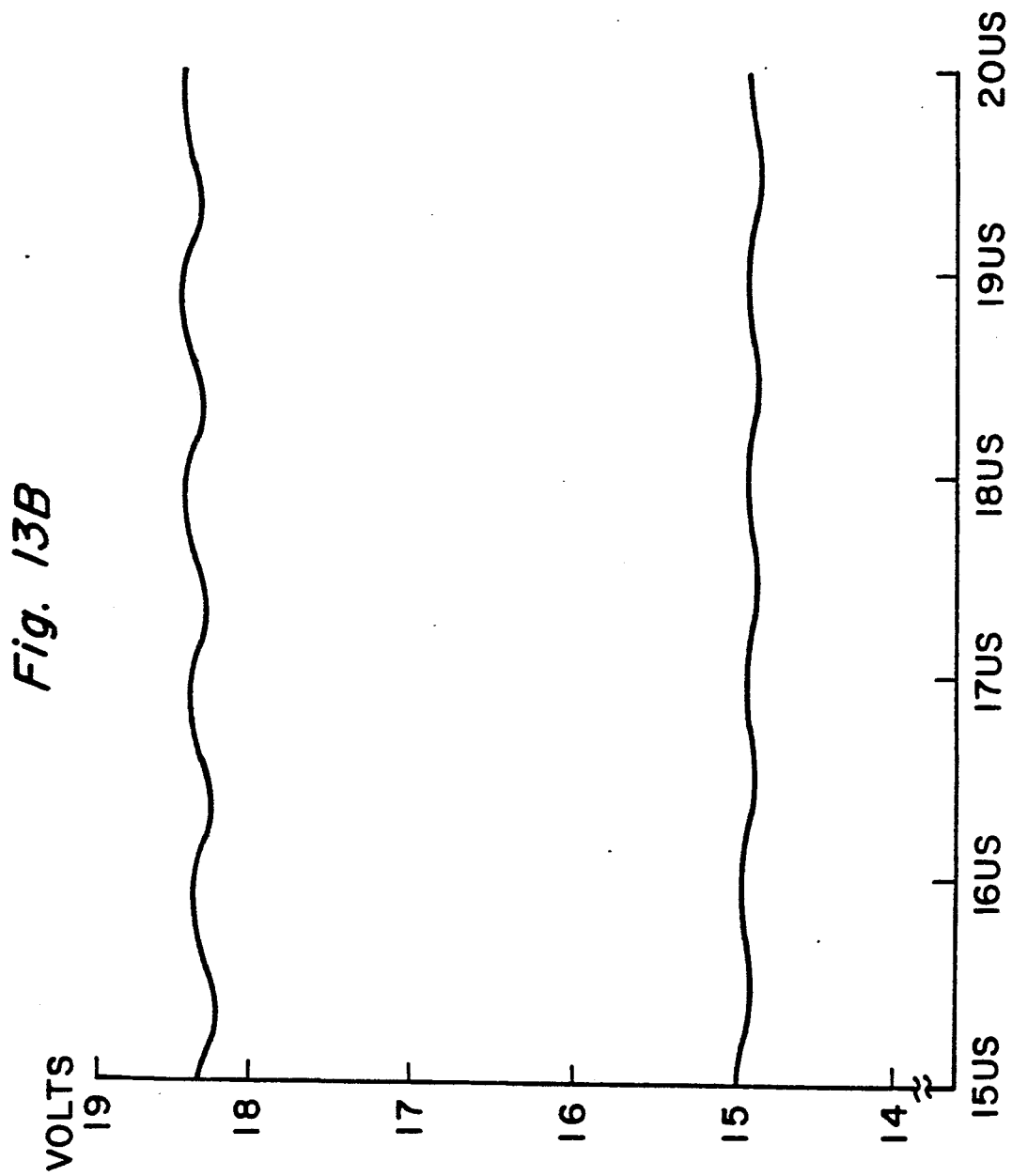

INDUCTOR SHUNT, OUTPUT VOLTAGE REGULATION SYSTEM FOR A POWER SUPPLY

BACKGROUND OF THE INVENTION

1. Field of the Invention

The present invention relates to the field of DC power supplies, and more particularly, to the field of regulated DC power supplies.

2. Background Information

Over the years, power supplies providing a DC output voltage have progressed from rather crude systems relying on selenium rectifiers or semiconductor diodes for their rectification which, although effective, were relatively inefficient and relatively poorly regulated by current standards, to much more sophisticated systems including sophisticated voltage regulation systems for providing tightly controlled output voltages which may have specifications as tight as 1%.

There are many systems in which a tightly regulated main power supply voltage must be supplemented by one or more auxiliary power supply voltages at other voltages. There are a number of ways of providing these auxiliary voltages.

In one of these, a resistive voltage divider (often including a zener diode) provides the auxiliary voltages. Such systems provide limited regulation of the auxiliary voltages and are quite lossy and thus are used primarily for low power outputs.

When overall power supply system efficiencies were not a major concern as was the case with benchtop power supplies for laboratory use, regulation of output voltages could be accomplished through use of zener diodes connected across the output to limit the maximum output voltage. Such systems were particularly common where the output voltage had a maximum limit on it, but a relatively loose minimum requirement.

With another alternative, a separate voltage supply is used for each output voltage. Such systems offer the advantage of tight control over all voltages. However, such systems suffer from several disadvantages. First, multiple transformers and regulation systems must be provided to control the various output voltages. This is expensive initially and results in a more lossy or lower efficiency system than some other techniques. Further, in some systems, the auxiliary voltages must have specified relationships to the main voltage. In systems with totally separate power supplies, this requires cross-connection of regulation systems to ensure that the output voltages track in the specified manner.

A further, frequently selected, alternative is to employ a single transformer with multiple secondary windings to provide these different voltages. In such systems, each distinct output voltage is derived from a different secondary winding of the transformer. Initially, such designs were quite effective because system specifications normally provided a much looser specification on the auxiliary voltages than on the main or master output voltage. As a result, normally no regulation was required on the individual auxiliary voltages. As electronic systems have become more complex, specifications on auxiliary output voltages for power supplies have become substantially tighter with the result that regulation requirements may be as tight as 1%.

For a number of reasons, including overall power consumption, thermal dissipation and a desire for high density packaging, modern power supply requirements often include tight efficiency specifications which may be as high as 80 or 90% overall efficiency. Consequently, such brute force auxiliary regulation techniques as the use of zener diodes across the auxiliary output are no longer considered acceptable. Similarly, multiple, essentially separate, power supplies are not an acceptable solution. Consequently, a need has developed for auxiliary regulation systems which provide tight regulation of their output voltages in combination with high efficiency operation in power supplies in which a single transformer drives all of the outputs.

Many modern power supply regulation systems rely on control of the frequency or pulse width of the signal provided to the primary of the power supply transformer to regulate the master output voltage of the power supply. In such power supplies, a change in the load current being drawn from the output (or the main output if there is more than one) produces a change in the signal applied to the primary which causes a corresponding change in the power available at the master output terminal. In the absence of auxiliary regulation, this causes a corresponding change (increase or decrease) in the power provided to the auxiliary output and thus, for a constant auxiliary load, results in a change in voltage at that auxiliary output.

In an article entitled "Post-Regulation Techniques for 100 KHz to 300 KHz Multiple-Output PWM Supplies (Limitations, Trends and Predictions)" given at the 1989 High Frequency Power Conversion International Conference, Clifford L. Jamerson, provides an overview of the considerations in the selection of a regulation technique for a multiple output power supply. He also provides brief descriptions and synopses of the advantages and disadvantages of 22 different techniques for regulating the auxiliary outputs of such a power supply. In this article, he indicates that the use of linear pass regulators is and will be high for supplies providing full load current outputs in the range from 0.1 to 2 amperes, square loop mag amp usage is high and will continue to be high for supplies having full load outputs of 2 to 20 amperes and synchronous switch post regulator (SSPR) usage, although not yet high, will become high for outputs having full load currents in the range from 2 to 10 amperes.

At pages 270-271 of that article, Mr. Jamerson sets forth advantages and disadvantages of synchronous switch post regulation. A disadvantage of SSPR which is not mentioned in that list is the fact that either one half of or all of the full load current flows through the switching device (depending on its location) and thus, the switching device contributes significantly to the overall loss in the system, via its conduction losses in addition to any switching losses.

As a consequence of modern power supply system specifications, there is a need for auxiliary output power supply regulation systems which provide tight regulation with high efficiency when operating in conjunction with separate regulation of a master output via control of the signal applied to the transformer primary. Further, a regulation technique which is advantageous over a wide range from low current (in the vicinity of 0.1 amp) to high currents (of 20 amps or more) would be desirable.

OBJECTS OF THE INVENTION

Accordingly, a primary object of the present invention is to provide an auxiliary output regulation system which provides tight regulation in combination with high efficiency.

Another object of the present invention is the provision of an auxiliary output regulation system which maintains the auxiliary output within specifications despite substantial variations in the load on a master regulated output.

Another object of the present invention is to provide an auxiliary regulation system which maintains the auxiliary output voltage independent of variations in the load on the master output.

Another object of the present invention is to provide a regulation system which is advantageous or optimum over a wide range of load currents.

SUMMARY OF THE INVENTION

The above and other objects which will become apparent from the specification as a whole, including the drawings, are achieved in accordance with the present invention by a post rectification, auxiliary regulation system which includes an auxiliary filter inductor connected in the current path between the auxiliary rectification system and the auxiliary output and which includes an auxiliary regulating switching system connected in parallel with that auxiliary filter inductor.

In accordance with one embodiment, the auxiliary regulating switching system may comprise a unidirectional switching device such as a field effect transistor with a diode connected in series therewith: the diode and FET being oriented to provide the ability to, in combination, hold off voltage in both polarities. The system provides its designed minimum auxiliary output voltage or power level when the auxiliary regulating switching system is held off at all times.

If the FET and diode are oriented to permit current flow from the output end of the inductor toward the rectifier end of the inductor when the FET is on, then the output voltage is increased by turning the FET on during a portion of the dead time of the rectification system to momentarily short circuit the inductor. This has the effect of increasing the average inductor current. The longer the inductor is short circuited in each dead period of the rectification system, the larger the output voltage or power becomes.

If the FET and diode are oriented to permit current flow from the rectifier end of the inductor toward the output end of the inductor when the FET is on, then the magnitude of the output voltage or power is increased by turning the FET on when the voltage at the rectification system is greater than the voltage at the output terminal. This bypasses the charging current for the output or storage capacitor around the inductor during the interval the FET is on to quickly charge that capacitor.

Alternatively, a switching device which is capable of holding off voltage in both polarities may be used without a series diode in which case, both of these regulation techniques may be used in the same system. Alternatively, two FET/diode sets may be connected in antiparallel in a single regulator.

A number of different methods of operating this post rectification regulation system may be employed in accordance with the particular results desired and the particular circuit employed.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 13A and 13B illustrate the output voltages and the output currents for the FIGS. 11 and 12 conditions, respectively;

DETAILED DESCRIPTION

Throughout this specification, in order to simplify the discussion, it will be assumed that all the output voltages of the power supplies being discussed are positive as indicated by the illustrated orientation of the diodes.

Figure 1:
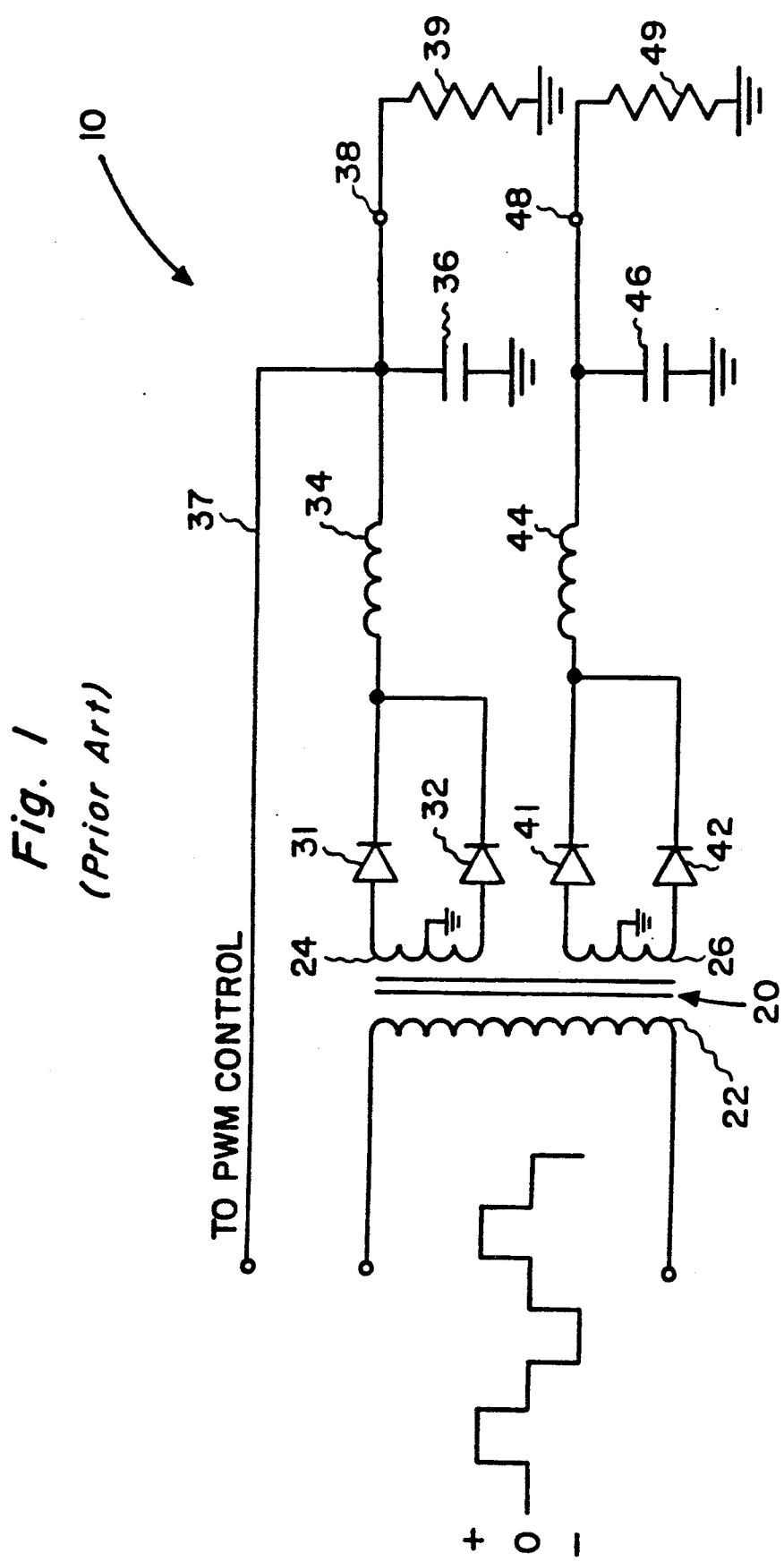
FIG. 1 illustrates a prior art multiple-DC-output power supply in which the power available at the auxiliary outputs tracks the power available at the main output.

In FIG. 1, a prior art two-output, pulse-width-modulation-controlled regulated power supply system 10 is illustrated in circuit diagram form. The power supply 10 comprises a transformer 20 having a primary winding 22, a master, center-tapped, secondary winding 24 and an auxiliary, center-tapped, secondary winding 26. The master secondary winding 24 is connected to a master output terminal 38 of the power supply through a pair of rectifying diodes 31 and 32 which are connected from the opposite ends of the winding 24 to a filter inductor 34 which is connected in the current path from the rectifiers to the output terminal 38. The center tap of the secondary is connected to ground. An output storage capacitor 36 is connected between the output terminal 38 and ground. A load 39, which is shown as a resistor, is connected between the terminal 38 and ground. A voltage feedback line 37 is connected between the output terminal 38 and a pulse width modulation (PWM) control system (not shown) which controls the pulse-width-modulated input signal to the primary winding 22 of transformer 20 in accordance with the relationship between the voltage at the output terminal 38 and the desired output voltage at that terminal. As is well known in the art, the pulse width modulation control adjusts the widths of the plus and minus pulses of the square wave applied to the primary winding 22 to adjust the output voltage at terminal 38 to the desired value. A representative pulse width modulation input waveform is illustrated at the terminals of the primary winding 22.

The auxiliary secondary winding 26 is connected to an auxiliary output terminal 48 through a pair of rectifying diodes 41 and 42, which are connected from the ends of the auxiliary secondary winding to an auxiliary filter inductor 44 which is connected in the current path from the diodes to the auxiliary output terminal 48. The center tap of this auxiliary secondary winding is connected to ground. An auxiliary output storage capacitor 46 is connected between the auxiliary output terminal 48 and ground. An auxiliary load 49, shown as a resistor, is connected between the auxiliary output terminal 48 and ground. In this power supply, the auxiliary output is regulated without respect to its actual output voltage in that it responds to the regulation of the main output voltage 38 and is not separately controlled. This lack of regulation of the auxiliary output is undesirable in many applications where tighter control of the auxiliary output voltage is required or where the load on the auxiliary output does not track the load on the master output.

Figure 2:
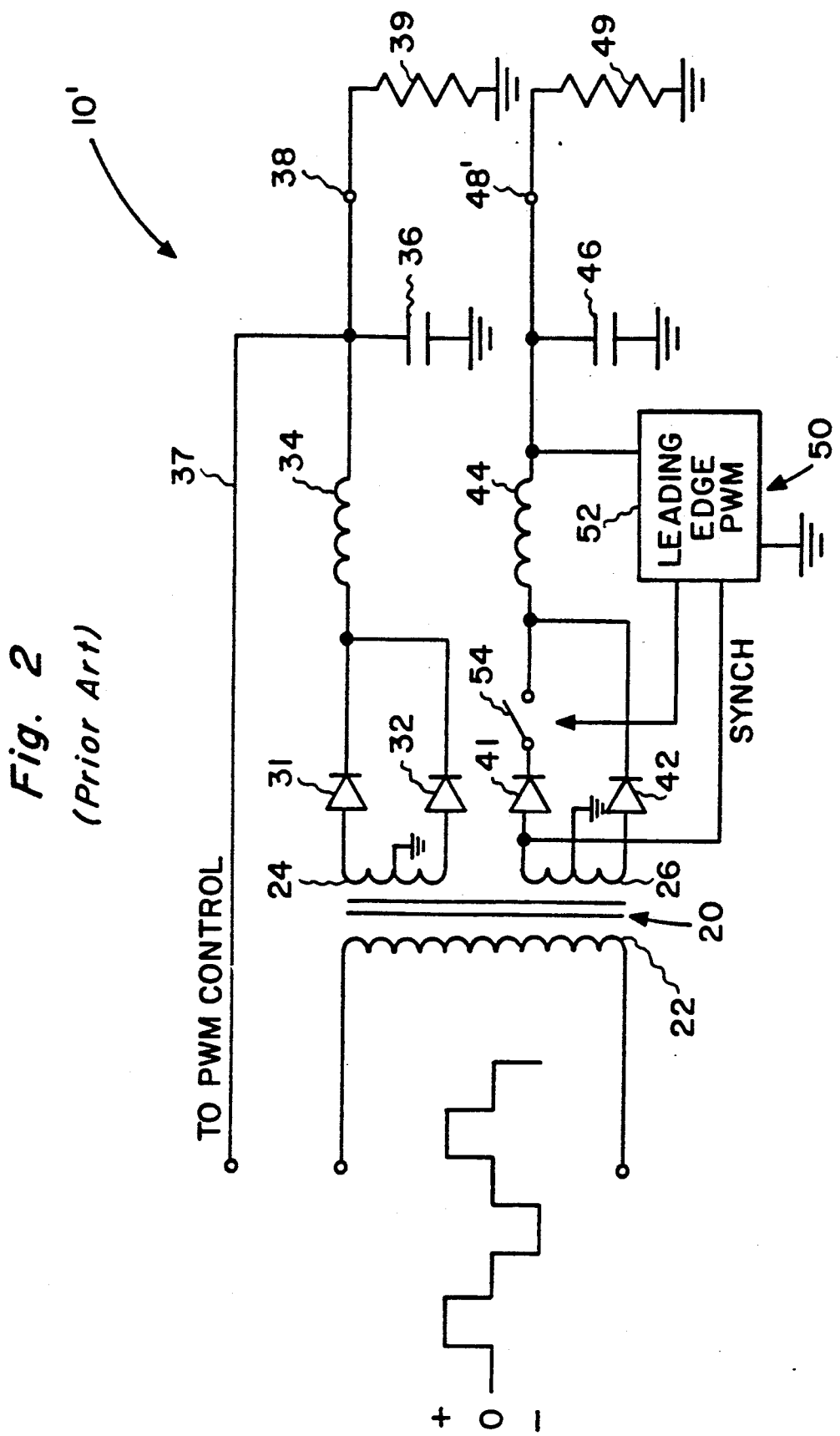
FIG. 2 illustrates a modified prior art version of the FIG. 1 structure including a synchronous switch regulation system in the auxiliary output.

FIG. 2 is a schematic circuit diagram illustration of an alternative prior art, two-output power supply 10'. The power supply 10' is like the power supply 10 except for the addition of an auxiliary regulation system 50 in the auxiliary output system. Because of the similarity between the power supplies 10 and 10', the same reference numerals are used in FIG. 2 as are used in FIG. 1 for corresponding components. Those components which are common to FIGS. 1 and 2 are not discussed here, unless necessary for the explanation of the regulation system. The regulation system 50 comprises a control system 52 and a synchronous regulating switch 54 which is connected between the diode 41 and the inductor 44. The control system 52 is connected to the output terminal 48' to sense the output voltage and to the end of the auxiliary winding 26 to which the diode 41 is connected for synchronization of the switching of the synchronous switch regulator switch 54 which may preferable be a FET.

With this synchronous switch regulation system, the output voltage at terminal 48' is a maximum when the switch 54 is maintained closed at all times. To reduce the voltage at the terminal 48, the synchronous switch regulator switch 54 is held open during a part of the cycle during which the diode 41 would otherwise hold the voltage at the diode end of the inductor 44 positive relative to the voltage at the output terminal 48'. In this way, the energy provided to the auxiliary filter comprised of inductor 44 and capacitor 46 is reduced. This type of regulation system has a limited efficiency because half of the energy provided at the auxiliary output at maximum output power must flow through the switch 54 which has finite, although hopefully small resistance, and thus dissipates significant power. Further, the switch 54, when being switched to reduce the output voltage at terminal 48', must either be turned off at a time when current is flowing through the switch or turned on at a time when a voltage is impressed across the switch, with the result that switching losses are added to the loss inherent in having the load current flow through the switch 54. This problem is compounded if the regulating switch is connected from the common node of the rectifiers to the inductor, since then the full load current flows through it.

As has been discussed, there is a need for a higher efficiency, high accuracy regulation system for auxiliary outputs of multiple output power supplies. A power supply (100) in accordance with the present invention which satisfies this need is illustrated in circuit diagram form in FIG. 3. This power supply is similar to the power supplies 10 and 10' except for the technique used to regulate the auxiliary output voltage. In the power supply 100, components like those in power supply 10 are identified by reference numerals whose numbers are larger by 100 than the corresponding components in the power supply 10. Those components are not discussed here, except as they are pertinent to the regulation system employed in power supply 100. In accordance with the present invention, an auxiliary output voltage regulation system 160 is added to the structure of the prior art power supply 10. The auxiliary output regulation system 160 comprises an auxiliary regulation control system 162 and an auxiliary regulating switching system 172. The regulating switching system 172 is connected across the auxiliary filter inductor 144. The control system 162 is connected to receive the output voltage at the auxiliary output terminal 148 and the voltage at the diode or rectification system end of the auxiliary filter inductor 144 in order that it may be responsive to the auxiliary output voltage and to the voltage across the auxiliary filter inductor 144, although this is not necessary if equivalent control information is provided in another way. The control system 162 controls the switching of the auxiliary regulating switching system 172 in accordance with the relationship of the actual value of the auxiliary output voltage to its desired value and in accordance with the voltage across the inductor 144.

We refer to this system as an inductor shunt, synchronous post regulation (ISSPR) system because regulation is achieved by selectively shunting the filter inductor 144 to allow current to flow around it.

Figure 4:
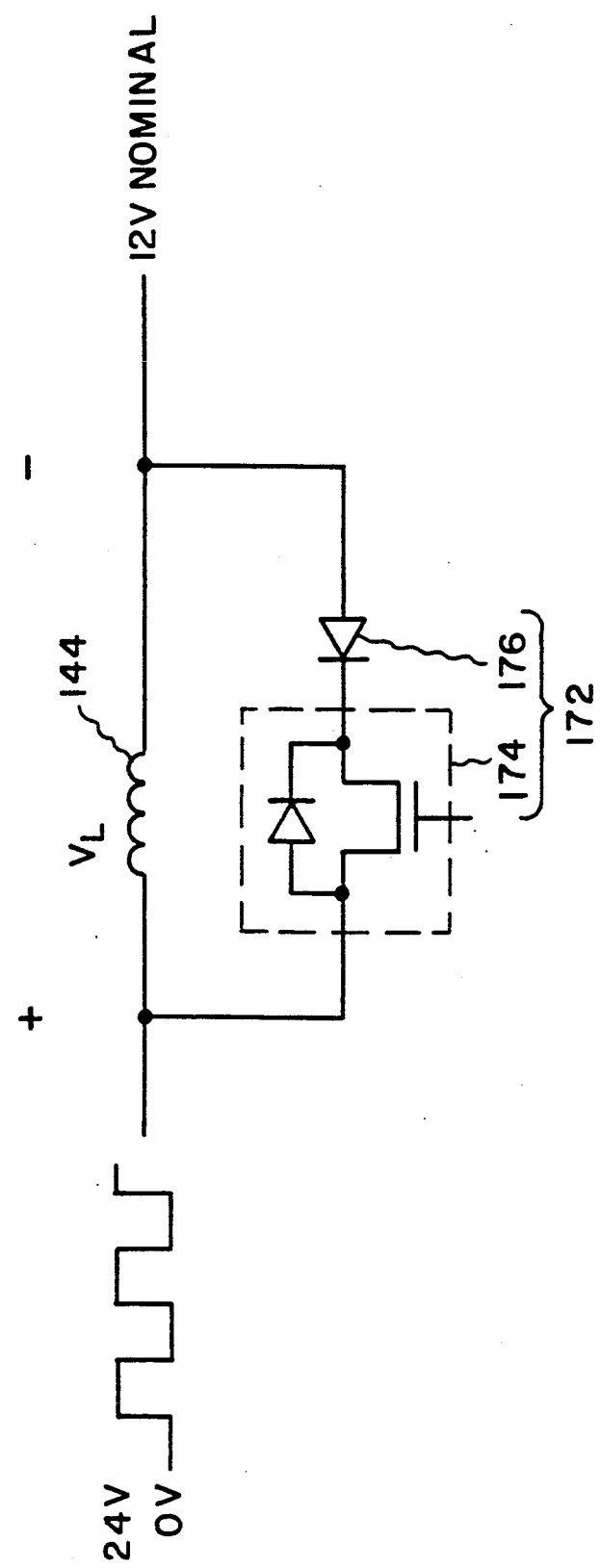
FIG. 4 illustrates a first specific embodiment of the auxiliary regulation system of FIG. 3.

In FIG. 4, the auxiliary filter inductor 144 and a particular auxiliary regulating switching system 172 are illustrated. The remainder of the power supply 100 is omitted from FIG. 4 for drawing clarity. The rectifiers would be to the left of the inductor 144 and the output or storage capacitor 146 would be to the right of the inductor, if they were included in FIG. 4. For purposes of discussion of the present regulation system, the voltage $V_L$ across the inductor is defined as positive when the voltage at its left-hand end is greater than the voltage at its right-hand end, as illustrated. It will be assumed that the nominal or minimum output voltage at the auxiliary output terminal 148 is +12 volts relative to ground and that the voltage provided at the rectifier or transformer end of the inductor 144 switches between plus 24 volts relative to ground and ground voltage. Consequently, when the voltage at the transformer or input end of the inductor 144 is at +24 volts, the inductor voltage $V_L$ is +12 volts and when the voltage at the input end of the inductor is 0 volts or ground, the inductor voltage $V_L$ is −12 volts The auxiliary regulating switching system 172 in FIG. 4 comprises a field effect transistor 174 connected in series with a diode 176. As illustrated within the dashed box, the field effect transistor 174 includes an internal body diode connected between its source and drain terminals. As such, this FET is a unidirectional switching device which is only capable of holding off voltage in one polarity (more positive at the right-hand end). In this circuit, this field effect transistor can hold off or prevent current flow therethrough in response to negative inductor voltages (i.e. control current flow therethrough in this polarity) independent of the presence of the diode 176, but would be incapable of holding off positive inductor voltages in the absence of the diode 176 (i.e. in the opposite polarity). The diode 176 is oriented to hold off such positive (opposite polarity) inductor voltages. Consequently, if the field effect transistor 174 is held in its off state at all times, no current will flow through the auxiliary regulating switching system 172.

Figure 5:
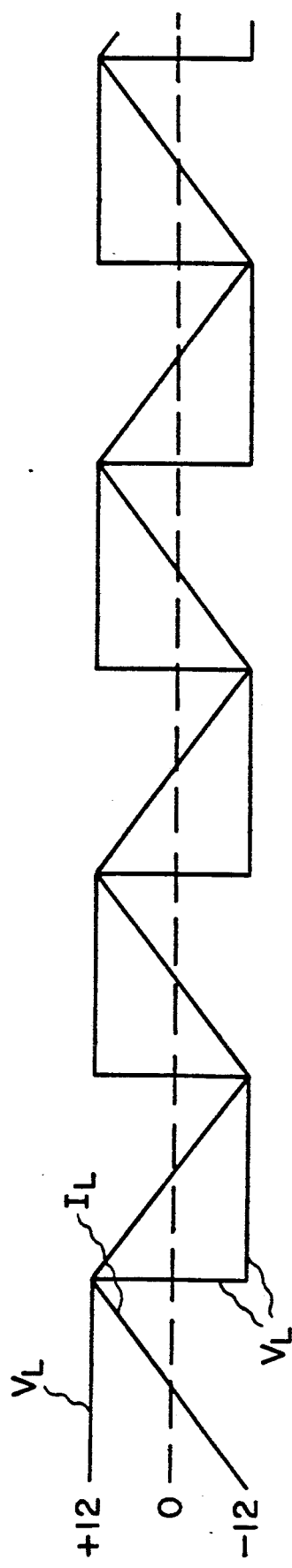
FIG. 5 illustrates the steady state voltage across the inductor in FIG. 4 with the regulator held off (unregulated output)

In FIG. 5, the voltage $V_L$ across the inductor 144 is illustrated as a function of time in the unregulated condition of the system, that is, with the field effect transistor 174 held off at all times and the rectified voltage a symmetric squarewave. The voltage $V_L$ is a square wave switching between +12 volts and −12 volts as the voltage at the input end of the inductor switches between +24 volts and ground voltage. Also shown in FIG. 5 is the resulting inductor current $I_L$. Under these conditions, the current $I_L$ has a symmetric saw tooth configuration in that it increases from its most negative value during the half cycle of the voltage waveform in which the voltage across the inductor is positive and decreases in a symmetric manner during the half cycle in which the voltage across the inductor is negative.

Figure 6:
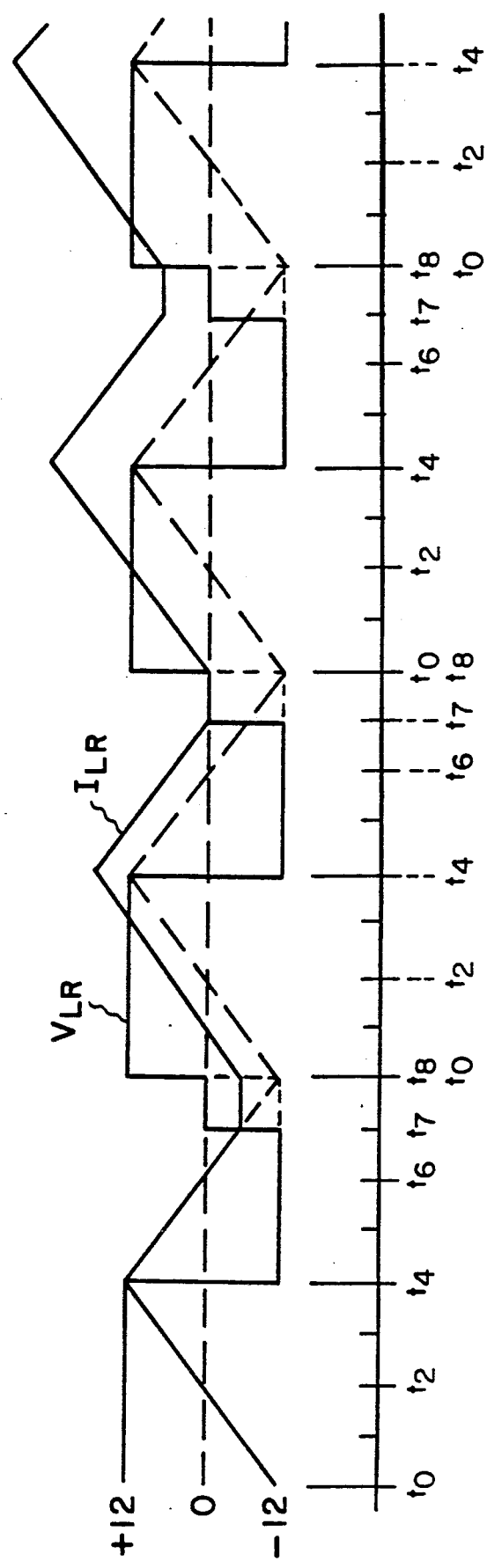
FIG. 6 illustrates the voltage across the inductor and the current through the inductor in FIG. 4 during a transition from an unregulated condition to a regulated condition.

If it is desired to increase the output voltage at the terminal 148 to greater than 12 volts the output voltage regulating switching system 172 is rendered conductive for part of a cycle in order to increase the power transfer to the output terminal 148. The voltage and current during the transient portion of such a change in regulated output voltage level are illustrated as solid lines in FIG. 6. In FIG. 6, the voltage across the inductor is identified as $V_{LR}$ and the current through the inductor is identified as $I_{LR}$. In both cases, the R has been added to the subscript to indicate that this is during the operation of the regulator. The corresponding values $V_L$ and $I_L$ are shown in dashed lines. The regulating switching system 172 is rendered conductive for an end portion of the half cycle of the input waveform during which the voltage across the inductor is negative. That is, from $t_7$ to $t_8$ of each half cycle. The inductor voltage is negative only during the period when both rectifiers 41 and 42 are off—which extends from t4 to t8 of each cycle. As illustrated in FIG. 6, the period during which the regulating switching system 172 is rendered conductive is one quarter of that negative-voltage half cycle or one eighth of the entire cycle of the rectified voltage. It will be understood that turning ON the regulating switch 174 at time $t_7$ is selected for illustrative purposes and the actual turn ON time is selected in accordance with the degree to which power must be increased in order to increase the output voltage to its new value. Further, as is explained more fully below, the FET 174 does not need to be turned OFF at exactly $t_8$, but can be turned off sometime in the $t_0$ to $t_4$ portion of the next cycle because of the commutating effect of the diode 176. We call this regulation technique "dead-time control" because the regulating switch conducts only during the dead time of the rectifiers.

When the switching system 172 is rendered conductive, it imposes a short circuit across the inductor 144, thereby forcing the voltage $V_{LR}$ to become zero. Since $$V_{LR} = L \frac{dI_{LR}}{dt} \quad (1)$$

where L is the inductance of the inductor 144, the inductor voltage being zero forces the inductor current to be constant. This produces the flat portion at the bottom of the sawtooth of the current waveform $I_{LR}$ from time $t_7$ to time $t_8$ in each cycle. This has the effect of reducing the amount of power which is transferred through the inductor 144 back to its input end. As a consequence, the average power provided through the inductor to the output terminal 148 increases. As may be seen from FIG. 6, this immediately increases the average current $I_{LR}$, thereby increasing the power being transferred to the output terminal 148. FIG. 6 is illustrated without adjustment for the change in voltage across the inductor which results from an increase in power transfer without an increase in the power being drawn from the terminal 148. That is, the shapes of the sawtooth waveforms are shown as though the voltage across the inductor continued to switch between +12 volts and −12 volts, despite the illustrated increase in output voltage.

Figure 7:
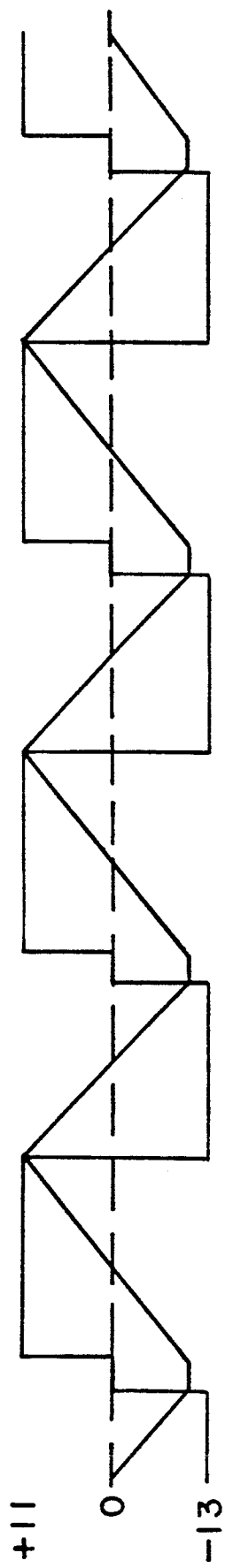
FIG. 7 illustrates the voltage across the inductor and the current through the inductor in FIG. 4 in a steady state regulated condition.

Once the output voltage has increased to its new desired value, the waveforms change to those shown in FIG. 7. It will be noted that in FIG. 7, the period during which the inductor is shorted is substantially shorter than is the case during the transient portion of the regulation process during which the storage capacitor 146 was being charged to its new output voltage. This is because during the transition time the regulator is supplying both the load current and capacitor charging current, whereas once the new voltage has been reached, the regulator is supplying only the load current because the capacitor is then charged to the new output voltage. Further, the slope of the two segments of the sawtooth current waveform are not identical. Thus, as illustrated, this regulation scheme can be used to change the auxiliary output voltage of the power supply. The duration of the transition period of the voltage change depends on the size of the storage capacitor 146 since it is the need to charge this capacitor which delays the voltage change.

Where the output voltage is to be held constant and the current being drawn from the output terminal 148 increases (with the result that additional power must be provided to the terminal 148), the increase in load current can be corrected for in a single cycle of the primary voltage by an appropriate change in the portion of the cycle for which the regulating switch is closed (assuming that the power then being drawn does not exceed the maximum which the regulator can provide. Naturally, that closure period must be maintained in each cycle until the current being drawn changes.

Similarly, where the auxiliary output voltage and current both remain constant, but the transformer PWM input is modified to meet the regulation needs of the master output, the resulting change in the voltage waveform at the rectifiers can be compensated for by adjusting the switching of the auxiliary regulating switch to compensate for the resulting change in available power by changing the portion of the available power which is transferred to the output terminals.

It will be noted that in FIGS. 6 and 7, the voltage across the inductor changes from being zero to being +12 volts at the same time as it would have switch from −12 volts to +12 volts if the switching system 172 had remained non-conductive at all times. This operation is inherent in the switching system shown in FIG. 4 because the transition to a positive voltage across the inductor reverse biases the diode 176. Those skilled in the art will recognize that there is in fact an insignificant delay in this voltage transition during which charge stored in the diode 176 is dissipated in order that the diode may become reverse biased and block current. However, that time period is normally miniscule and can be ignored, particularly where diodes which are fast compared to the power supply operating frequency are used, in which case, the risetime of the transformer waveform may exceed the diode turn-off time. The diodes 176 may be junction diodes, Schottky barrier diodes, PIN diodes or any other diode which may be appropriate to the particular voltage and current levels to which the device will be exposed and the desired operating frequency. It will be understood that typical power supplies of the type being discussed have auxiliary output voltages which are typically less than 20 volts. Therefore, since the maximum voltage imposed across the diodes is the inductor voltage which cannot be more than the 24 volt swing at the input end of the inductor and is typically about half of that, the diodes 176 do not need to be high voltage diodes.

Because of the presence of the diode 176 and its voltage-reversal-induced turn-off characteristic, the turn-off of the switch 174 is non-critical so long as it turns off during the time period that the voltage across the inductor is positive.

For this reason, it is preferred to time the turn-ON of the FET in a manner in which proper regulation is provided when the FET is left ON until after the polarity of voltage across the inductor reverses with the result that current flow through the switching regulation system is terminated by reverse bias of the series diode (i.e. by commutation of the voltage across the diode). Under such circumstances, the exact point in the rectification system cycle at which the FET is turned OFF becomes non-critical so long as it is turned Off after the diode becomes reverse biased and before the polarity of the inductor voltage reverses again to a polarity which would cause current flow through the FET in its ON state. This minimizes switching losses since there is then no current in the switch at the time it turns OFF. This can significantly simplify the control system since it eliminates any need to provide a precisely timed turn-off signal.

The portion of the negative half cycle of the inductor voltage that the switching device is on controls the power transferred to the load terminal 148 and thus, the output voltage. Consequently, the turn-on time of the switch 174 must be accurately controlled with a precision which is determined by the regulation tolerance which is required from the auxiliary output. The less strict the regulation required, the less precise the turn-on time of the switching device has to be.

This inductor shunt synchronous post regulation system is suitable for use with regulators which operate over a wide range of frequencies from about 20 KHz to about 2 MHz or more. The frequency limiting factors being size of the components of the main PWM circuits at the low frequency end and timing and switching loss considerations at the high frequency end. The upper limit will increase as component characteristics improve.

Figure 8:
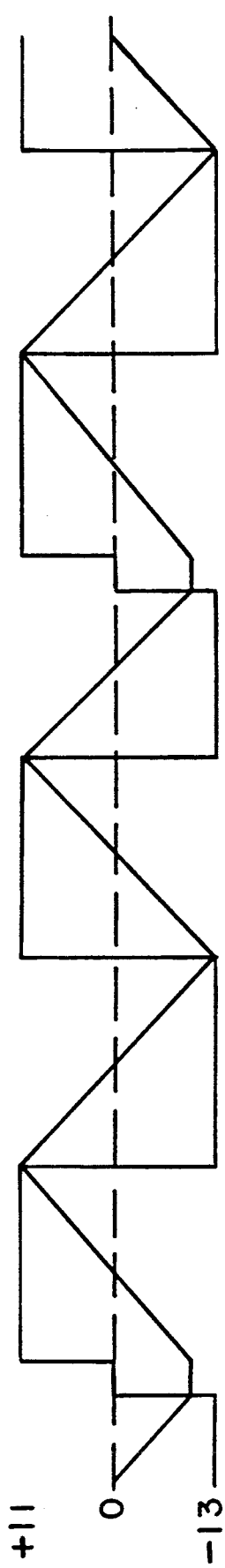
FIG. 8 illustrates the voltage across the inductor in FIG. 4 in an alternative steady state regulation method.

In FIG. 7, the illustrated waveform is one in which the switching device 174 is rendered conductive for the same portion of each cycle of the inductor voltage. Where only a short ON period is required for the device in order to provide the required regulation, that time period may be short enough that it would be unreasonably expensive to provide a control system which could provide a pulse with that accuracy. Under those circumstances, the switching device may be turned on only every other cycle (as shown in FIG. 8 or every third cycle, etc.) with the switch being on for a longer time period each time it is on than would be the case if it were turned on during every cycle.

This regulation system has a number of advantages as compared to the synchronous switch regulation system of power supply 10' shown in FIG. 2. First, when the auxiliary output is running at its nominal or minimal power level, the switching device is off at all times. Consequently, no current flows through the switching device and there are no losses in the switching device. Thus, greater efficiency is obtained. When more than nominal power is required at the auxiliary output, the switching device is turned on for a period which increases with increasing power requirements. Under these conditions, some current flows through the switching device and there are some losses in the switching device. However, these losses are a function of the increase in power required at the auxiliary output and thus remain a small percentage of the power being delivered. This regulation system is symmetric in that when regulation is obtained by turning the device on in each negative half cycle of the inductor voltage, equal power is drawn through each of the rectifying diodes 41 and 42. In contrast, the synchronous switch regulator illustrated in power supply 10' in FIG. 2 inherently performs all of its regulation by modifying the current drawn through the diode 41 only. However, it will be noted that the system 100 of FIG. 3 will have a similar effect when the switching device is gated on only every other negative half cycle of the inductor voltage. However, that would normally be random as to which diode happened to be the conducting diode when that every other negative half cycle switching pattern was initiated. Further, switching the device on only every third cycle would alternate between the diodes.

Figure 3:
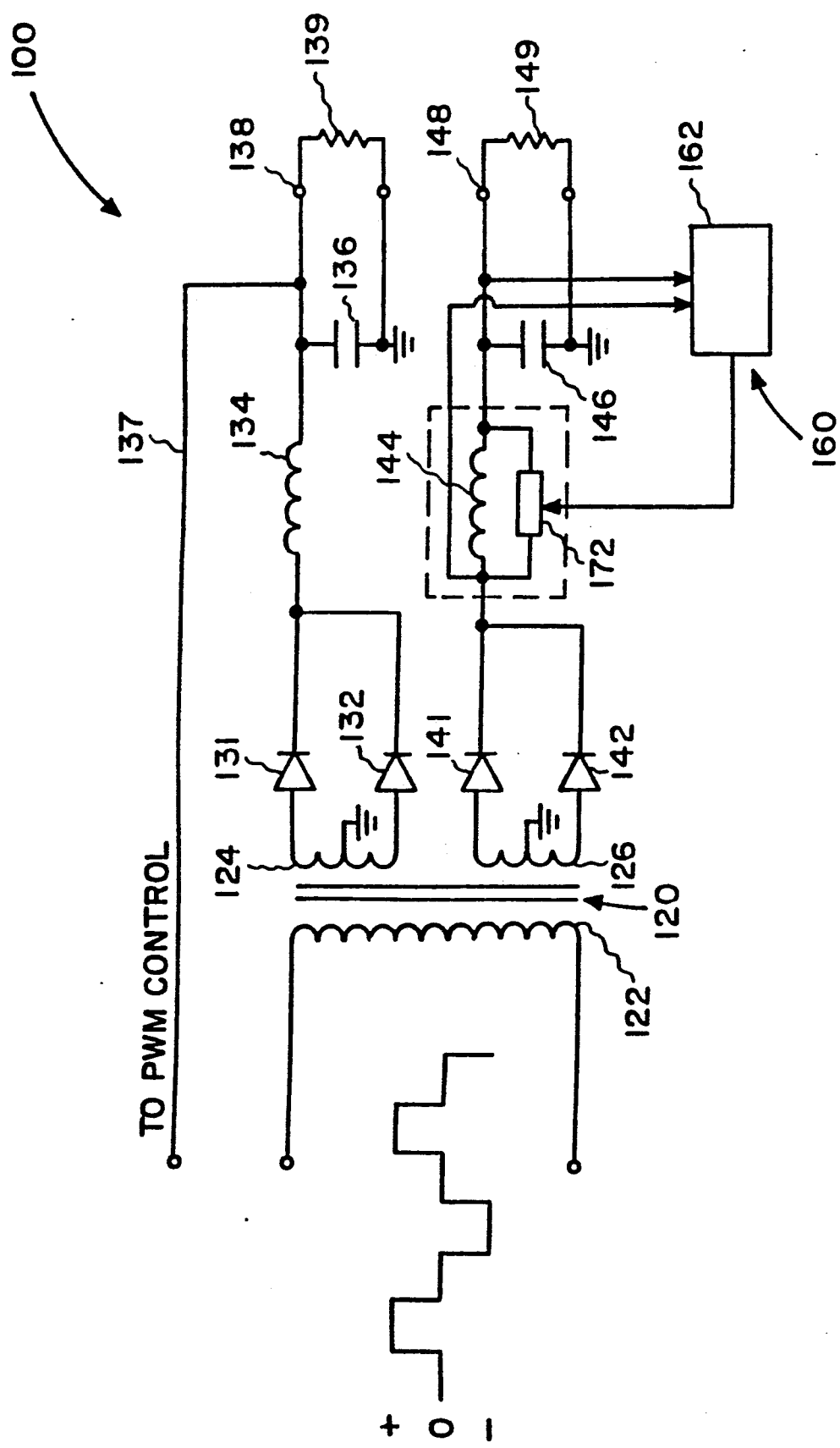
FIG. 3 illustrates a multiple output power supply system including a post regulation system in accordance with the present invention which is shown in a general form.

The switching device 174 and the diode 176 should be capable of carrying the maximum inductor current in system 100 of FIG. 3 in a manner which is similar to that in the synchronous switch regulator of FIG. 2 because if power demands result in the switching device being on for long periods of time, the switch device current may approach that value. However, the switch will normally be much less stressed than that because for small increases in the power demanded, the switching device will be turned on near the end of the negative half cycle of the inductor voltage, when the inductor current will be near its minimum value.

Figure 17:
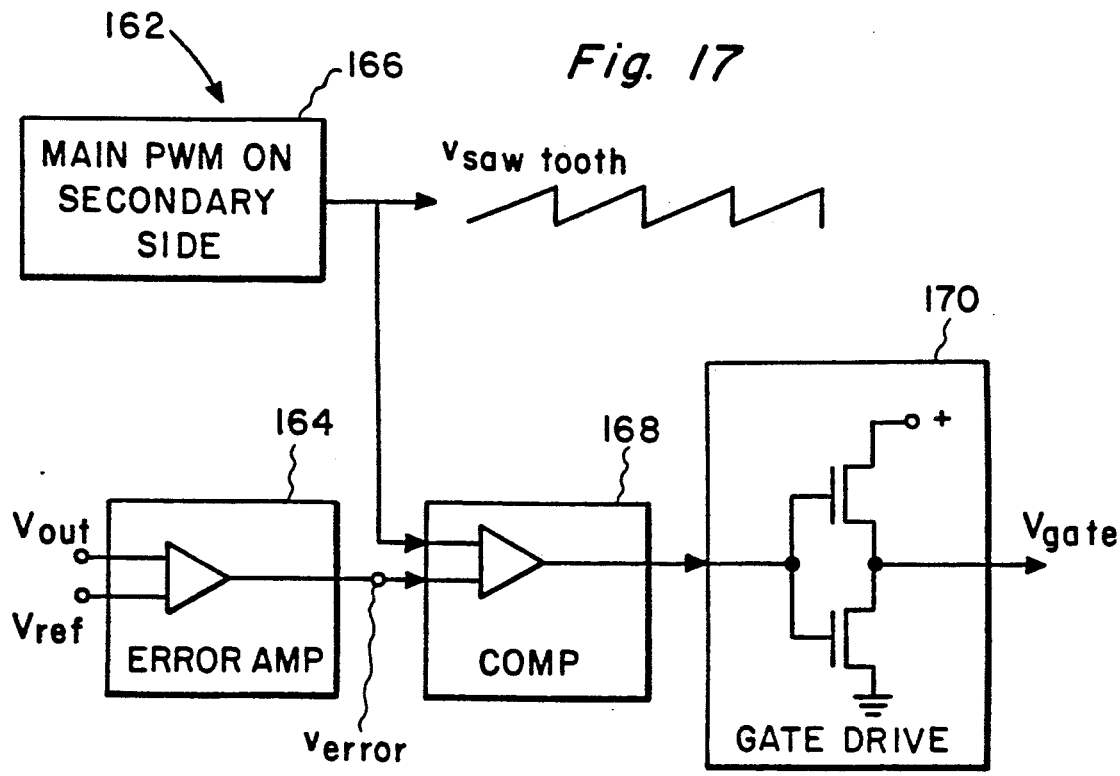
FIG. 17 illustrates a control system suitable for use in the FIG. 3 system to control dead time regulation.

In FIG. 17, a preferred control system 162 for the regulating switching device 174 is illustrated in block diagram form. This system comprises an error amplifier 164, a sawtooth generator 166, a comparator 168 and a gate drive system 170. The error amplifier 164 receives the output voltage $V_{out}$ at terminal 148 as one input and a reference voltage $V_{ref}$ as the other input. The output of the error amplifier 164 is an error voltage. The DC level of this error voltage varies in accordance with the difference between the input voltages to the error amplifier. The sawtooth generator 166 may take any of a number of forms. The preferred form is the internal sawtooth waveform within a pulse width modulation chip (a signal which is normally available at an external terminal of the chip). This sawtooth waveform is synchronized with the switching of the devices which control the regulation of the master output of the overall power supply 100. Where a pulse width modulation chip such as the UC1825 or UC1828 is used to control the regulation of the master output, this sawtooth waveform is available at one of the chip terminals. The sawtooth waveform from sawtooth generator 166 is applied to the positive input of the comparator 168 while the voltage $V_{ERROR}$ is applied to the negative input of the comparator. As a consequence, the output from the comparator 168 is positive only when the sawtooth voltage is greater than the error voltage. The gate drive circuitry 170 may preferably be a field effect transistor totem pole comprised of an N channel device connected in series with a P channel device between the positive DC supply and ground with the gates connected in common to the output of the comparator as illustrated in FIG. 17. This circuit holds the gate terminal of FET 174 at ground voltage whenever the lower FET in the gate drive circuit 170 is conductive and holds the gate terminal of FET 174 positive whenever the lower FET in circuit 170 is off and the upper FET in circuit 170 is conducting. As is well known, the common connection of the gates of these two complementary type FETs connected in series causes them to switch in unison with one on and the other off except during the switching transient when both are off momentarily.

Timing and voltage waveforms relevant to the operation of this control system are illustrated in FIG. 8. The voltage $V_{RECT}$ is the rectified voltage at the output of the rectifiers The sawtooth waveform is the waveform provided by sawtooth generator 166. The error voltage $V_{ERROR}$ is a relatively steady DC voltage which varies in amplitude in accordance with the deviation of $V_{out}$ from the reference voltage $V_{ref}$. The voltage $V_{GATE}$ is the voltage applied to the gate of FET 174 and renders the FET 174 conductive whenever $V_{GATE}$ is positive. It will be noted that the sawtooth voltage has a period which is twice that of $V_{RECT}$. This is because the sawtooth voltage is synchronized with the primary side signal and the rectification process in the full wave rectifier has the effect of doubling that frequency.

As $V_{out}$ increases, the $V_{ERROR}$ increases. When $V_{out}$ is at or above the reference voltage $V_{ref}$, $V_{ERROR}$ is more positive than the peak of the sawtooth voltage and $V_{GATE}$ never becomes positive and the FET 174 stays off at all times. As the output voltage $V_{OUT}$ drops, $V_{ERROR}$ decreases. Once $V_{ERROR}$ is less than the peak sawtooth voltage, $V_{GATE}$ goes positive and turns on the FET 174 for a duration which is proportional to the degree to which $V_{ERROR}$ has decreased to less than the gate sawtooth voltage. It will be noted that the lower $V_{ERROR}$ becomes, the earlier the FET 174 turns on and as a result, the shorter the period during which $I_{LR}$ decreases prior to becoming fixed by the turning on of the FET 174 to short the inductor. Consequently, the lower $V_{ERROR}$ is, the more the power delivered to the output terminal 148 increases. Those skilled in the art will recognize that the tightness of the regulation of the auxiliary output voltage is determined by the amplification factor of the error amplifier as compared to the amplitude of the sawtooth voltage. Tighter regulation is provided by increasing the amplification of the error amplifier.

Figure 19:
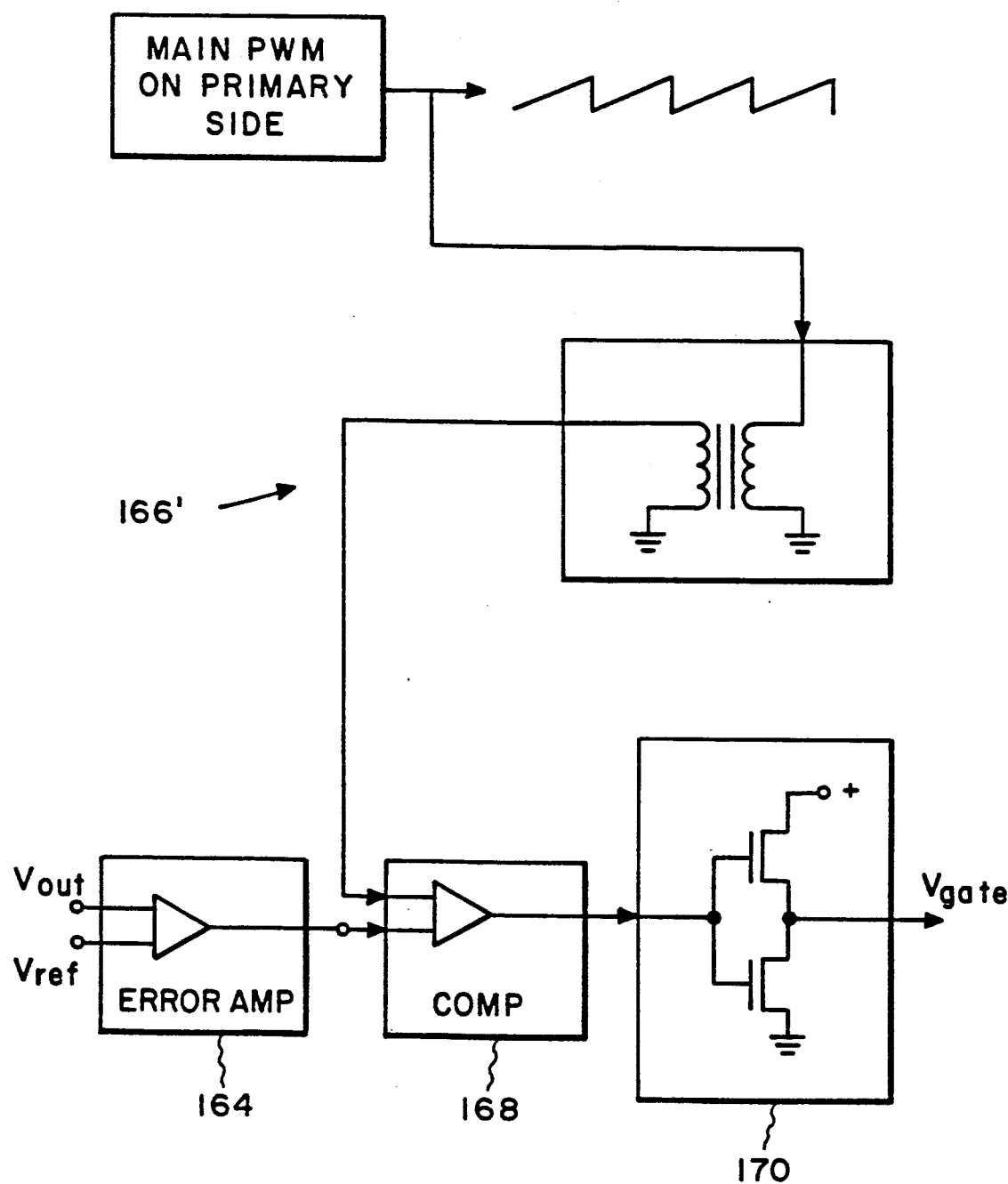
FIGS. 19-21 illustrate alternatives to the FIG. 17 system.
Figure 20:
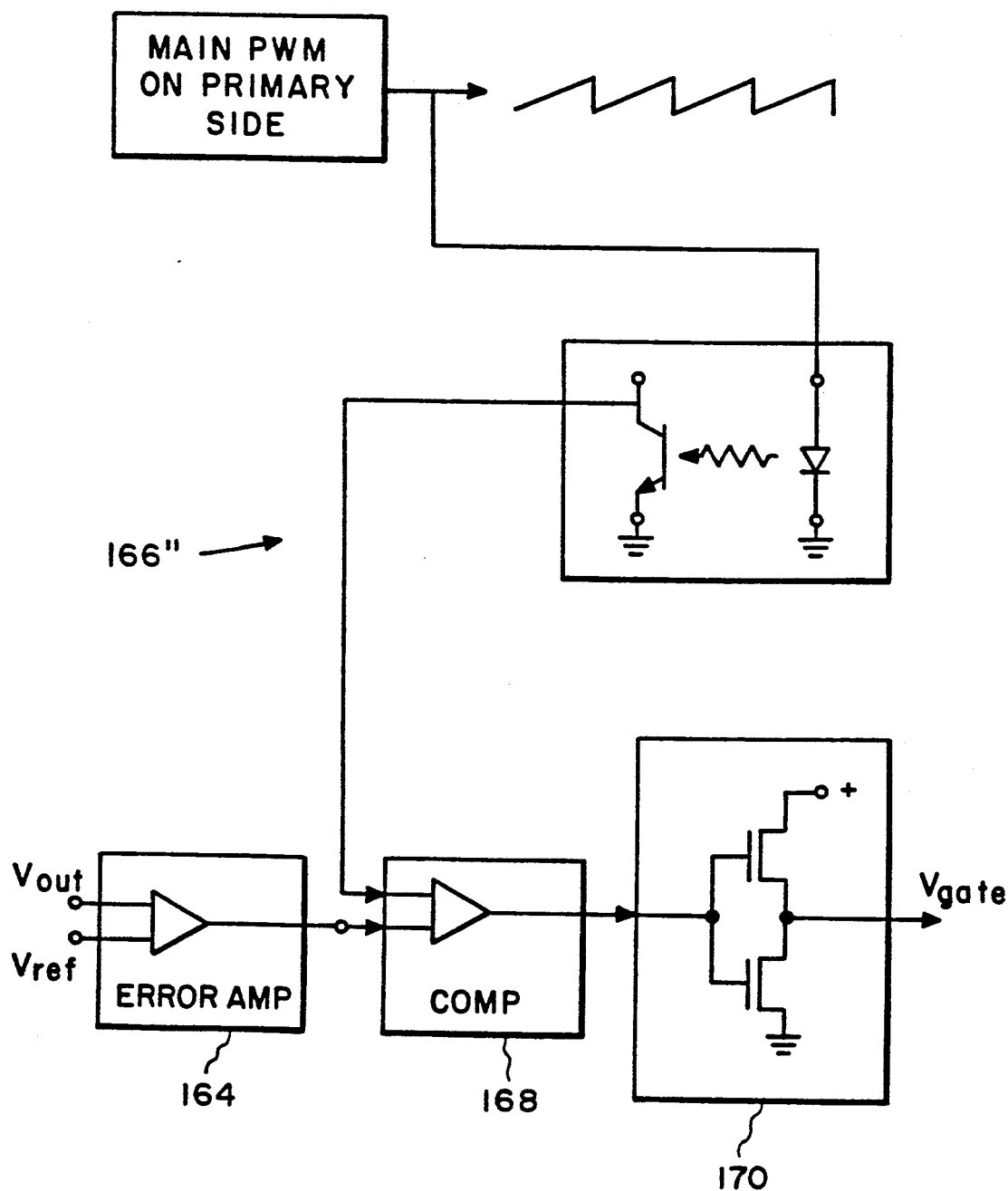
Figure 21:
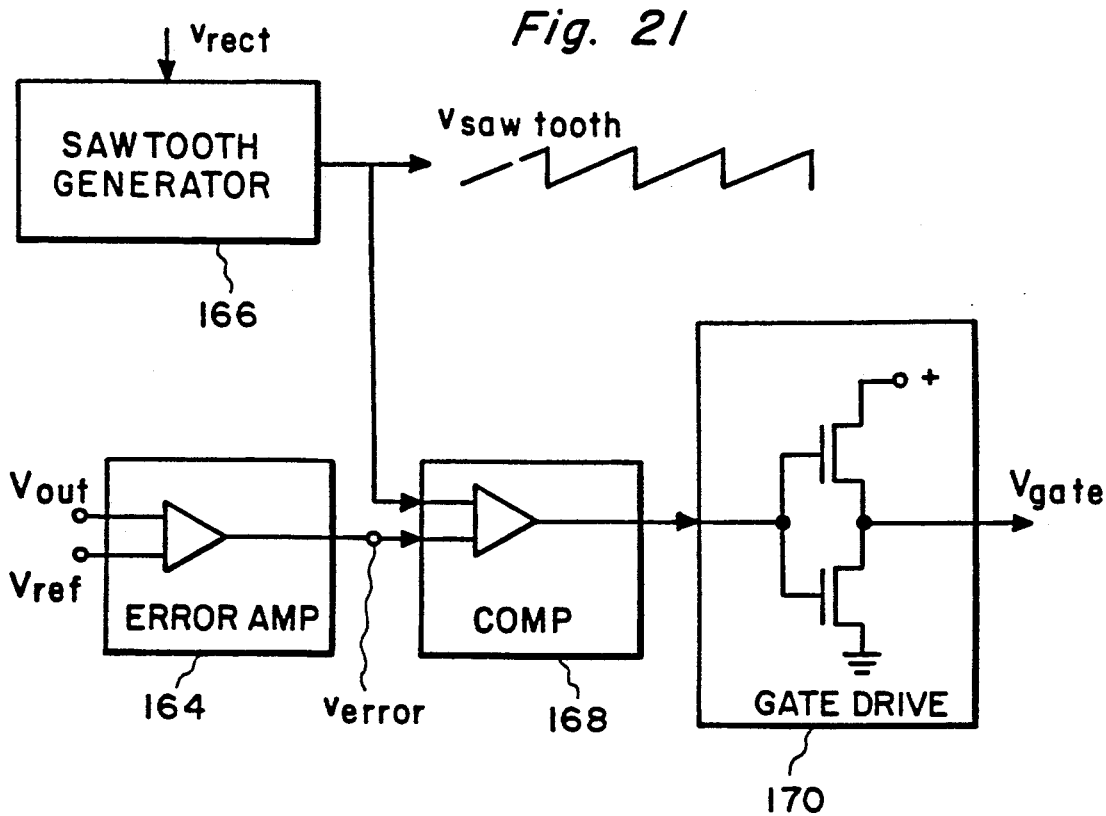
Figure 22:
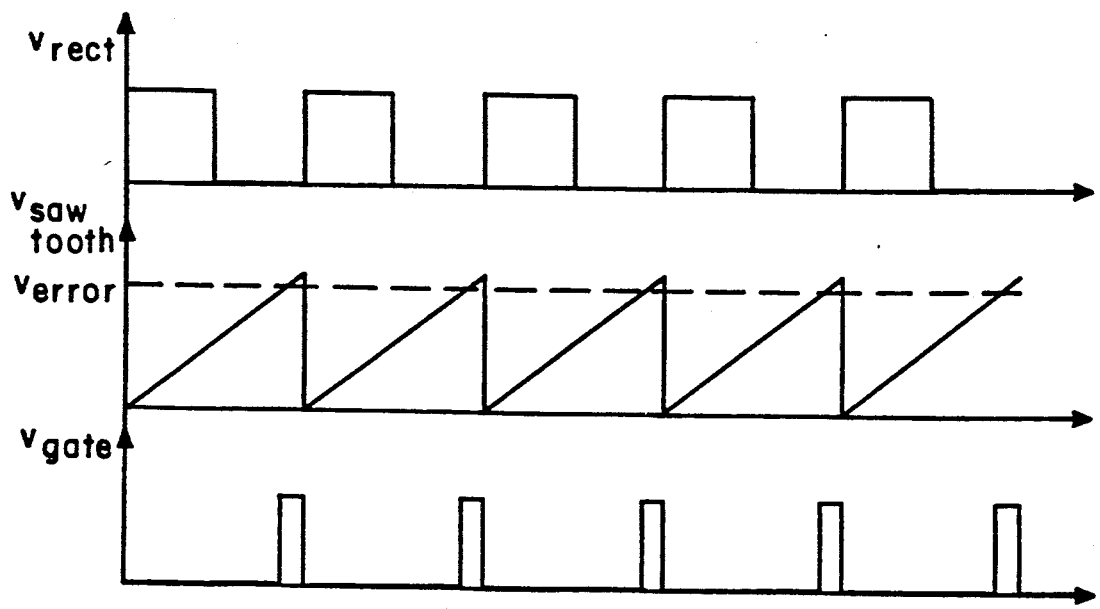
FIG. 22 illustrates voltages in the FIG. 21 control system.

Alternative configurations for control system 162 are illustrated in FIGS. 19-21. It will be noted that in each of these configurations, the error amplifier 164, the comparator 168 and the gate drive circuitry 170 are unchanged from that in FIG. 17. These systems differ in the means for providing the sawtooth waveform to the comparator 168.

In FIGS. 19 and 20, the pulse width modulation chip is connected on the primary side of the transformer with the result that it is desirable to isolate the auxiliary regulation system from the primary side of the transformer. FIG. 19 provides this isolation via a transformer, while FIG. 20 provides that isolation by an optical coupler. The operation of these systems is substantially identical to the operation of the FIG. 17 control system.

Figure 18:
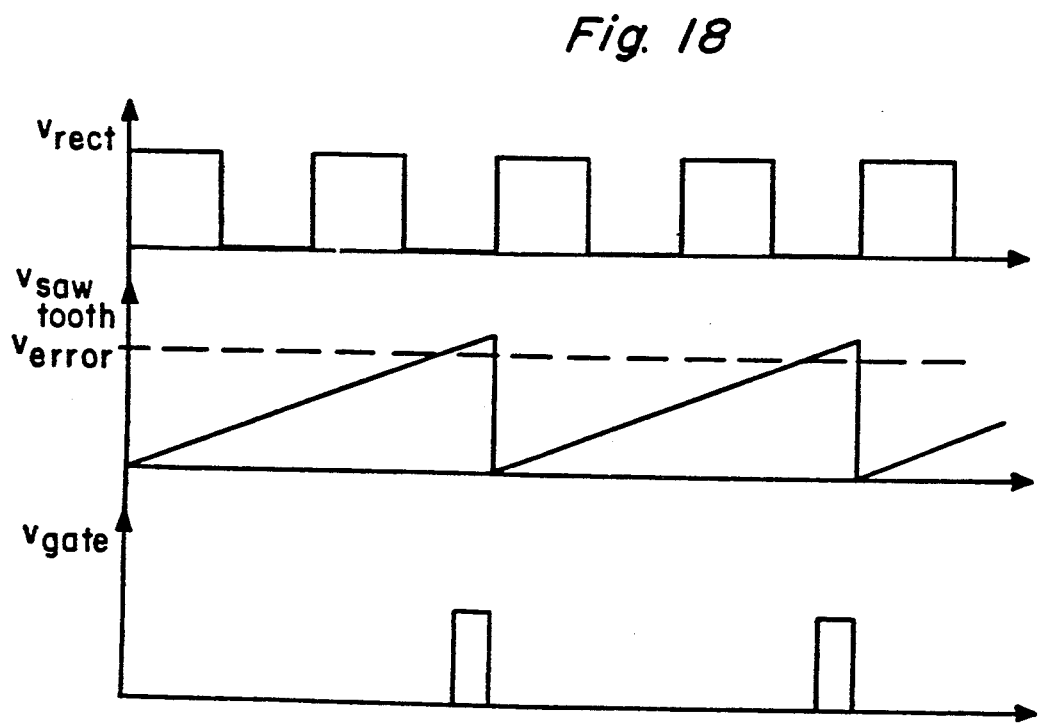
FIG. 18 illustrates voltages in the FIG. 17 control system.

In FIG. 21, a further alternative control system 162' is illustrated. Once again, the error amplifier 164, the comparator 168 and the gate drive circuitry 170 are unchanged from FIG. 17. In this embodiment, the sawtooth generator, rather than being part of a pulse width modulation chip, is a separate sawtooth generator circuit which receives $V_{RECT}$ as its input and provides a sawtooth voltage as its output. In FIG. 21, the voltages relevant to the operation of this control system are illustrated in a manner which is substantially identical to the manner in which the voltages are illustrated in FIG. 18. The most significant difference between the FIG. 21 and the FIG. 18 waveforms is the fact that the sawtooth waveform has the same frequency as $V_{RECT}$ because it is derived from that voltage. As a result, the FET 174 is turned On every cycle of $V_{RECT}$ whenever $V_{ERROR}$ is less than the peak sawtooth voltage.

The control circuits of FIG. 17 and FIG. 21 provide substantially similar operation of the regulation system. However, the FIG. 21 system will have slightly less ripple than the FIG. 17 system because regulation is applied in every cycle of $V_{RECT}$ rather than in every other cycle of $V_{RECT}$. However, for the same regulation, the FET 174 in a power supply controlled by the control system illustrated in FIG. 21 is turned on for only half as long each time as the FET controlled by a control circuit as in FIG. 17. This can become a significant consideration if the ON period of the FET, as controlled by the FIG. 21 control system becomes short enough that switching it ON for that short a period becomes difficult or expensive, since the ON period in a power supply controlled by the FIG. 17 system is always twice as long as that controlled by the FIG. 21 system.

Figure 9:
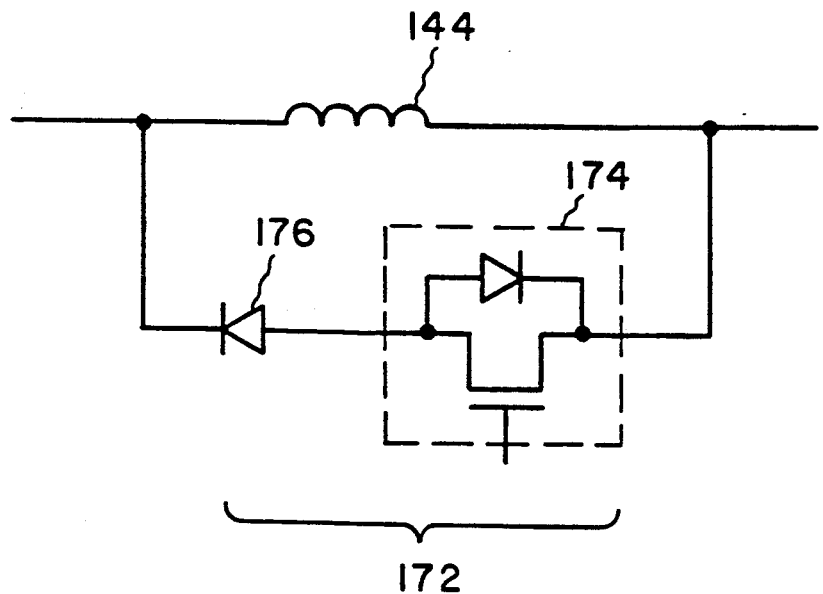
FIG. 9 illustrates an alternative configuration of the regulation system of FIG. 4.

In FIG. 9, an alternative configuration for the switching system 172 is illustrated in which the position of the diode 176 and the field effect transistor 174 are merely reversed without any change in their polarities. This system is, for all purposes, identical in its operation to the system shown FIG. 4.

Figure 10:
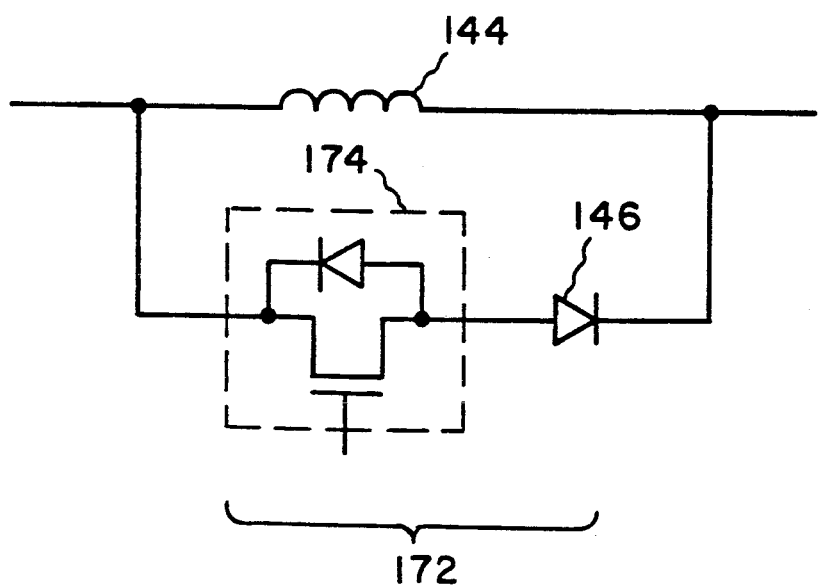
FIG. 10 illustrates a further alternative configuration for the regulation system of FIG. 3.

In FIG. 10, an alternative switching system 172' is illustrated which provides a different regulation mechanism. This switching system 172' is similar to the switching system 172 of FIG. 4, with the exception that the polarity of both the diode 176 and the field effect transistor 174 are reversed.

In this orientation of the diode and the field effect transistor, the diode blocks current conduction from the output to the input of the inductor and thus, the particular regulation technique used with the FIG. 4 configuration of the switching system cannot be used. In the FIG. 10 orientation, when the field effect transistor is on, the switching system can conduct current from the input end of the inductor 144 to the output end of the inductor 144. That is, the switching system 172 then bypasses the inductor to conduct current directly from the rectifiers to the output terminal or storage capacitor. Again, this switching system is one in which the switching device is OFF all the time when the auxiliary output is running at its nominal or minimum power output. The switching device is only rendered conductive as greater output power is required. In this case, the switching device is turned on for a small portion of the positive half cycle of the inductor voltage to conduct a pulse of current to rapidly charge the output storage capacitor. We call this regulation technique "quick-charging control" because the regulating switch conducts a substantially higher current than the inductor and rapidly charges the output storage capacitor.

Figure 11A:
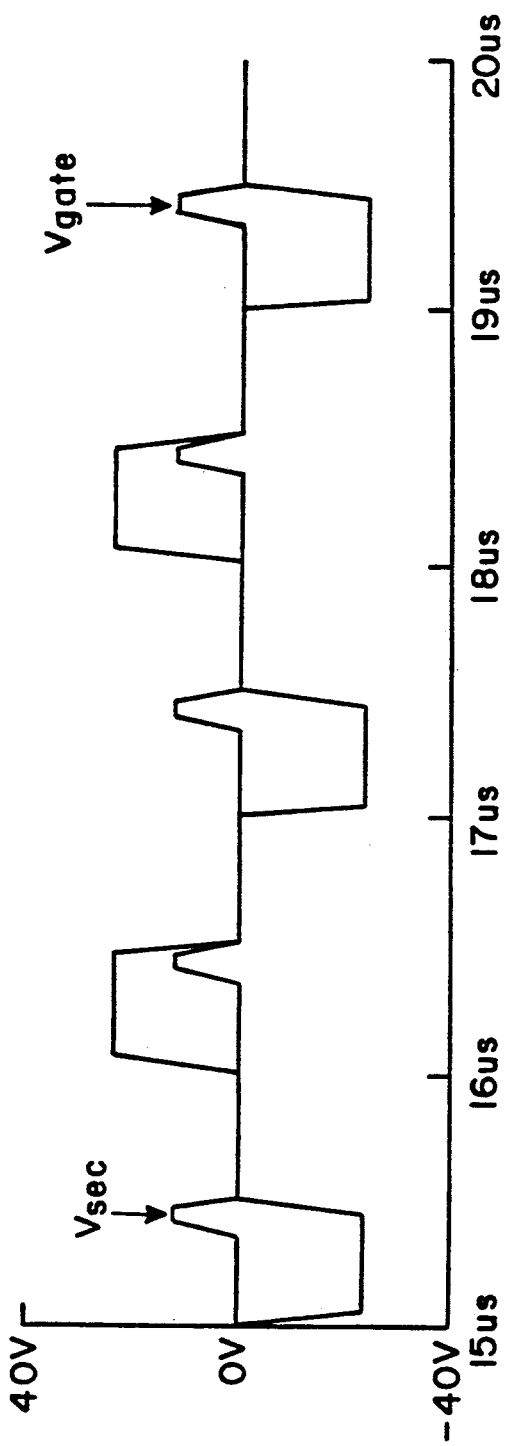
FIGS. 11A and 11B illustrate voltages and currents in the FIG. 10 regulator under a relatively light load.
Figure 11B:
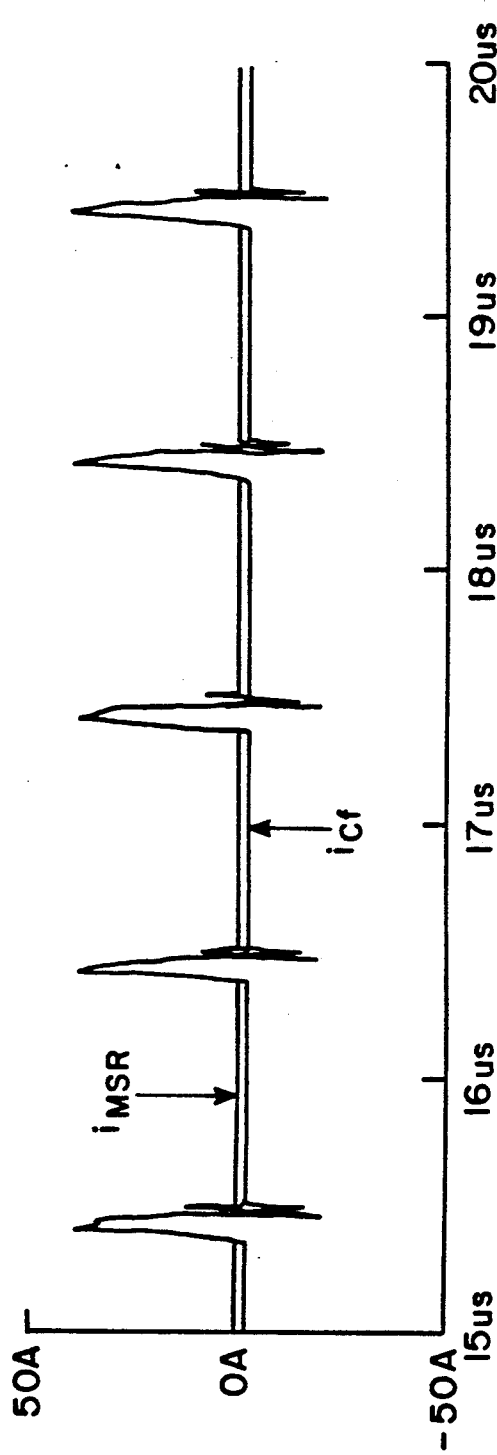

The longer the time period that the switching device is on during that half cycle, the more current is conducted to that filter capacitor and the more power is available at that output. FIG. 11A illustrates the voltage of the auxiliary secondary winding as a function of time and the voltage applied to the gate of the field effect transistor 174 as a function of time, when the FET is gated on for 50 nanoseconds during each half cycle. FIG. 11B illustrates the current in the field effect transistor as a function of time and the current in the filter capacitor as a function of time. It will be noted that the peak current conducted by the switching device is in the neighborhood of 40 amps. Thus, a higher power field effect transistor must be used in this switching system than is needed in the FIG. 4 switching system for the same power output.

Figure 12A:
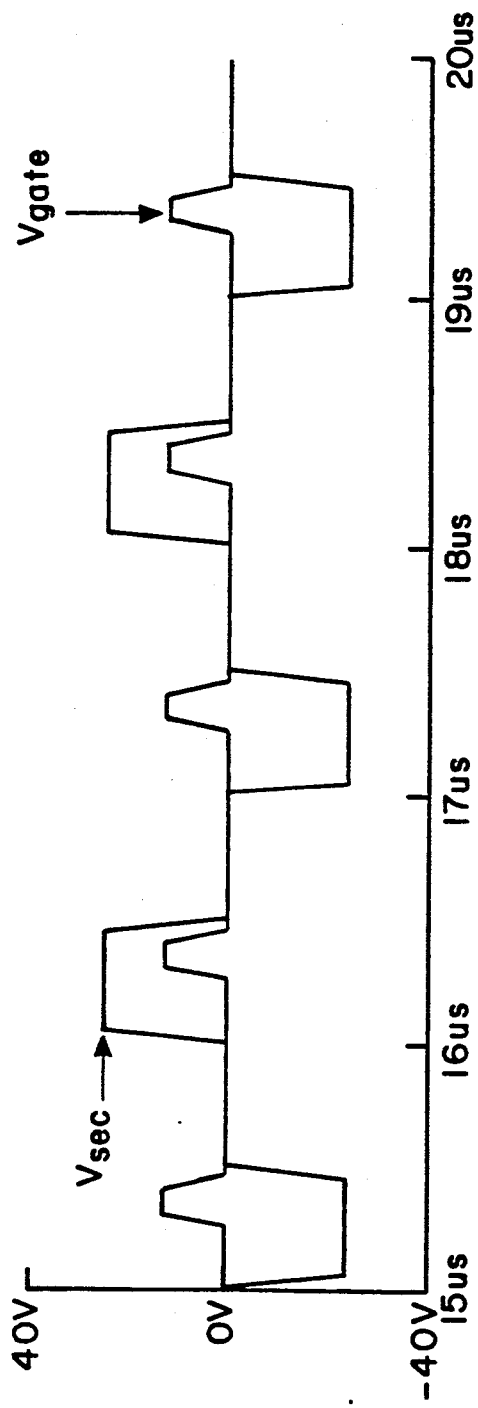
FIGS. 12A and 12B illustrate the same voltages and currents in the FIG. 10 regulator under a relatively heavy load.
Figure 12B:
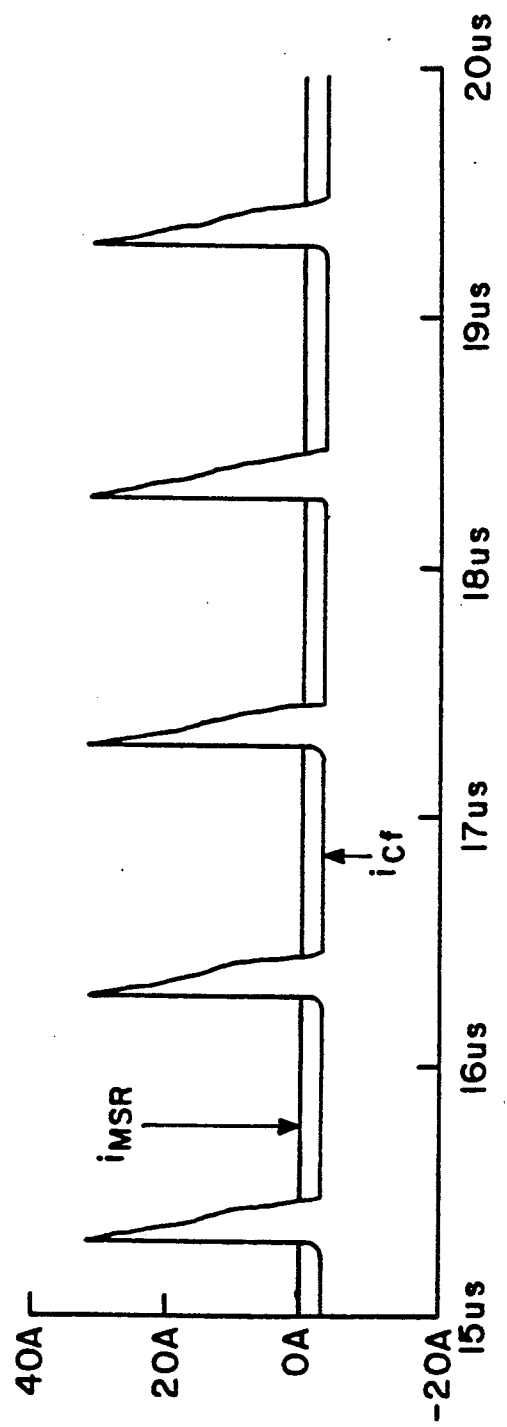

FIGS. 12A and 12B are similar to FIGS. 11A and 11B except that the duration of the gate pulse which renders the FET conductive has been doubled from 50 nanoseconds to 100 nanoseconds. In FIG. 13, the output voltage provided by the auxiliary output when driving a 6 ohm load, is illustrated as a function of time for the 50 nanosecond on period of the switching device 174 and for the 100 nanosecond on time of the switching device. It will be noted that the current increases from about 2.5 amps to slightly more than 3 amps and has an increased amplitude ripple. In FIG. 13B, the voltage output for these two conditions is illustrated. It will be noted that the output voltage increases from about 15 volts to about 18.25 volts and that the voltage ripple is in the neighborhood of two tenths of a volt. Thus, for this regulation scheme where low ripple is required, an ancillary filter may be required between the filter capacitor 146 and the output terminal 148 to reduce this ripple.

Figure 14:
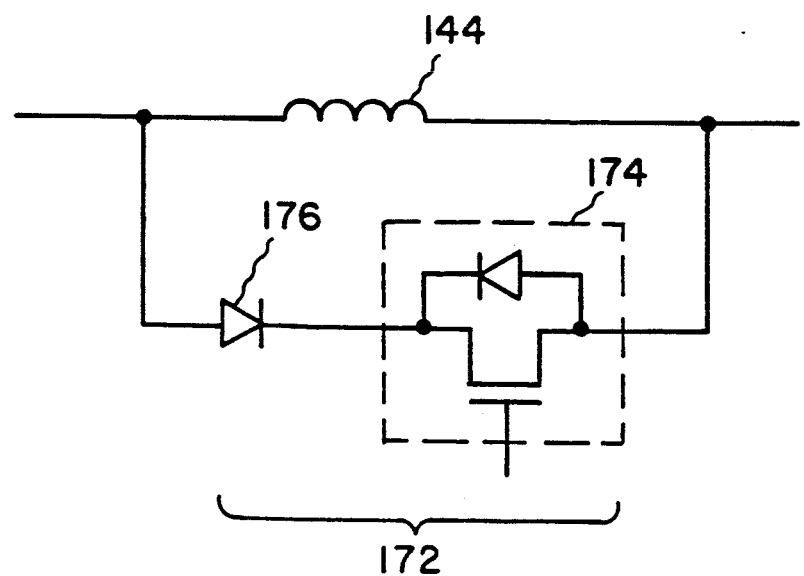
FIG. 14 illustrates an alternative configuration for the regulation system of FIG. 10.

FIG. 14 illustrates a switching system similar to that in FIG. 10, but with the position of the diode and the FET reversed, with no change in the polarity. This system operates in the same manner as the FIG. 10 system.

Figure 24:
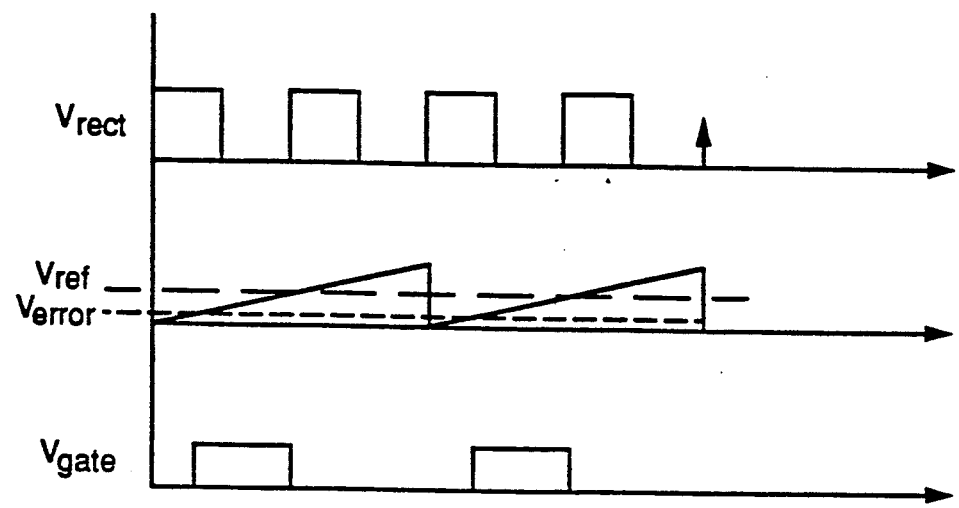
FIGS. 24 and 26 illustrate waveforms associated with the FIG. 23 and 25 systems, respectively.
Figure 23:
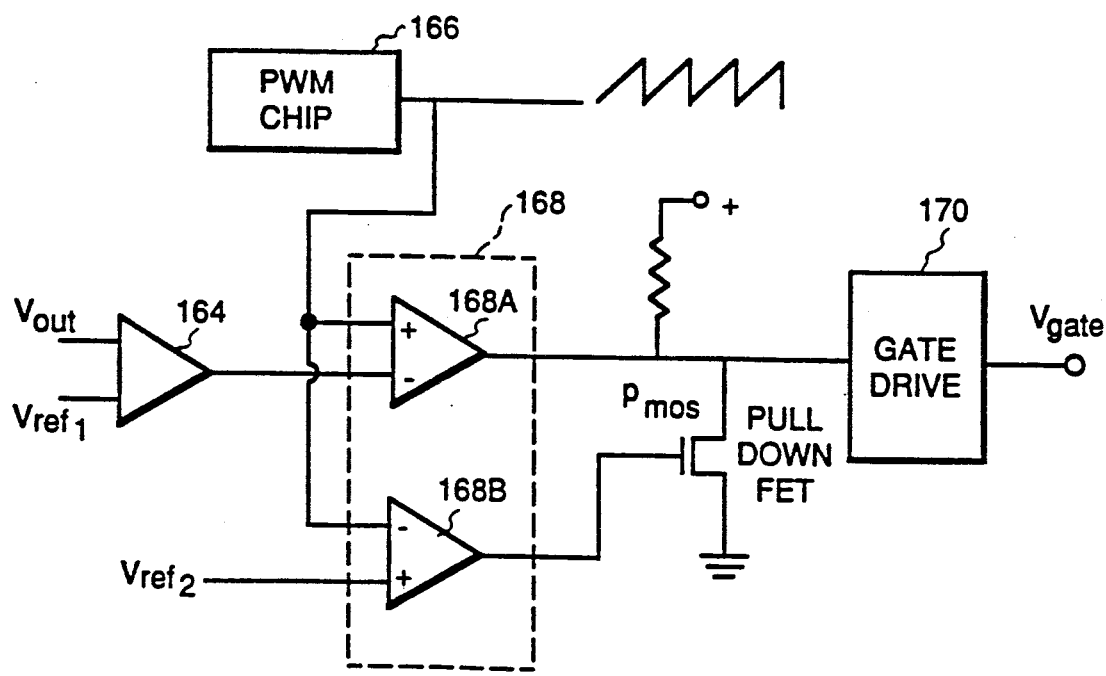
FIGS. 23 and 25 illustrate control systems suitable for use in the FIG. 3 system to control quick charging regulation.

In FIG. 23, a control system suitable for the FIG. 10 system is illustrated. The sawtooth generator 166 is a secondary side PWM chip. The comparator 168' is a dual comparator in which the upper comparator 168A functions in a manner similar to that of the comparator 168 of FIG. 17. The comparator 168B in combination with the pull-down FET 169 serves to turn the gate drive circuit off when the saw tooth rises above $V_{ref2}$ thereby maintaining comparator 168A in control of the period of time for which the regulating switch is on. This restricts regulating switch to conducting every other positive cycle of the $V_{RECT}$. The pull-down FET Can be either a pMOS or an NMOS device, depending on the input polarities to comparator 168B. Corresponding voltage waveforms are illustrated in FIG. 24.

Figure 26:
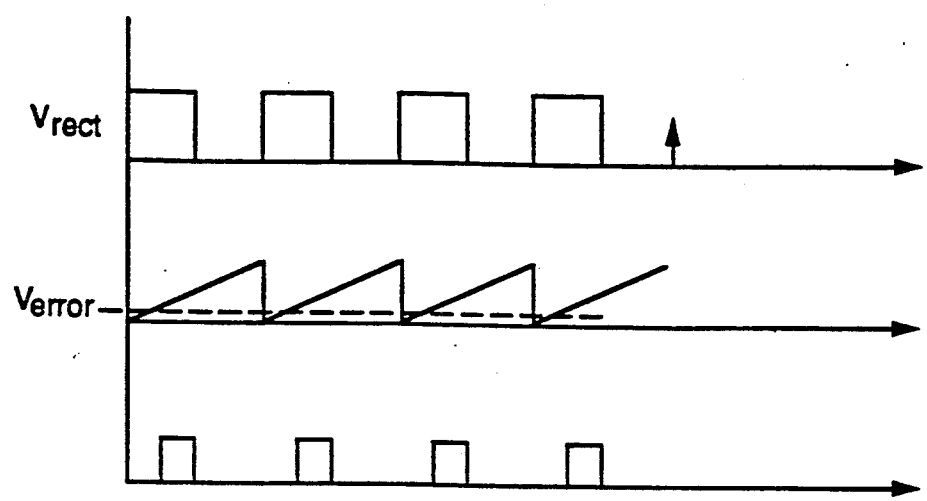
Figure 25:
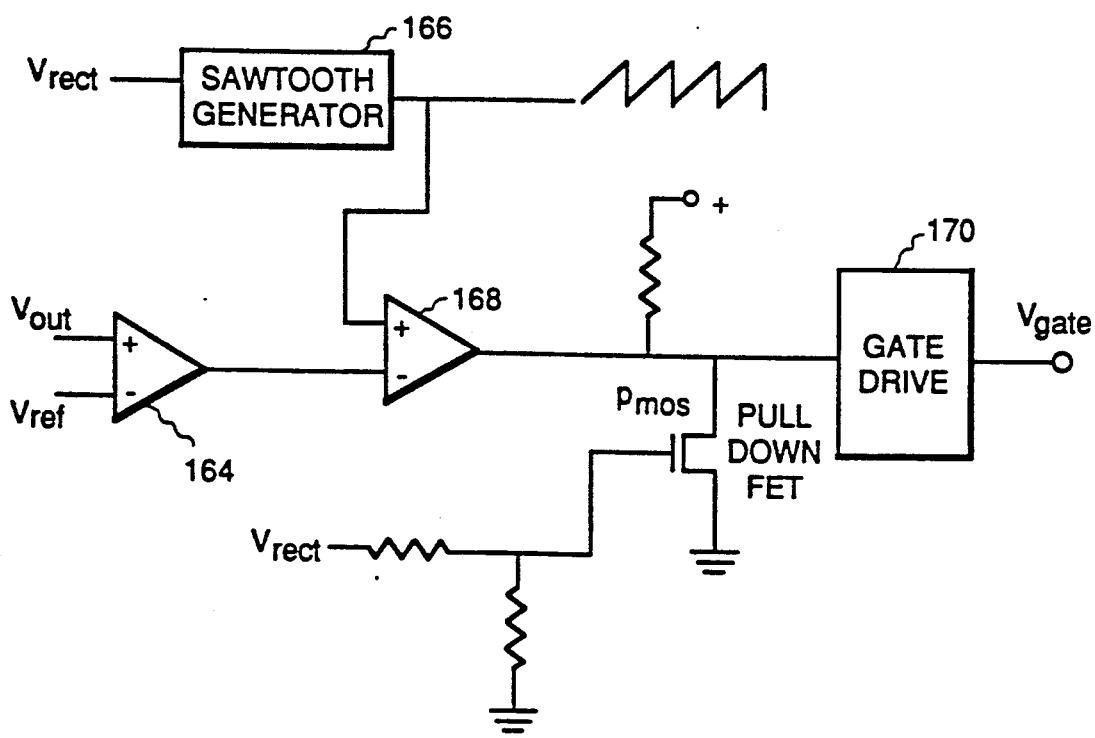

An alternative control system for the system of FIG. 10 is illustrated in FIG. 25. Corresponding voltage waveforms are illustrated in FIG. 26. In FIG. 25, the sawtooth generator 166' generates the sawtooth from the rectified voltage. The error amplifier 164 functions in the same manner as in the other control systems. The comparator 168 functions in a similar manner to the other comparators, but is provided with a level off-set and a pull-down FET to properly time the conduction of the regulating switch. IN this circuit, the pull-down FET must be a PMOS device. This system puts less stress on the rectifiers and the regulating switch than the FIG. 23 control system because the quick charging current is turned on at twice the rate that is provided by the FIG. 23 system.

The FIG. 10 regulation system shares the advantage of non-critical turn-off of the switching device which is characteristic of the FIG. 4 configuration, provided that the turn-on time of the switching device is selected to provide the desired duration of on-time when turn-off is provided by commutation of the voltage across the switching system.

Figure 15:
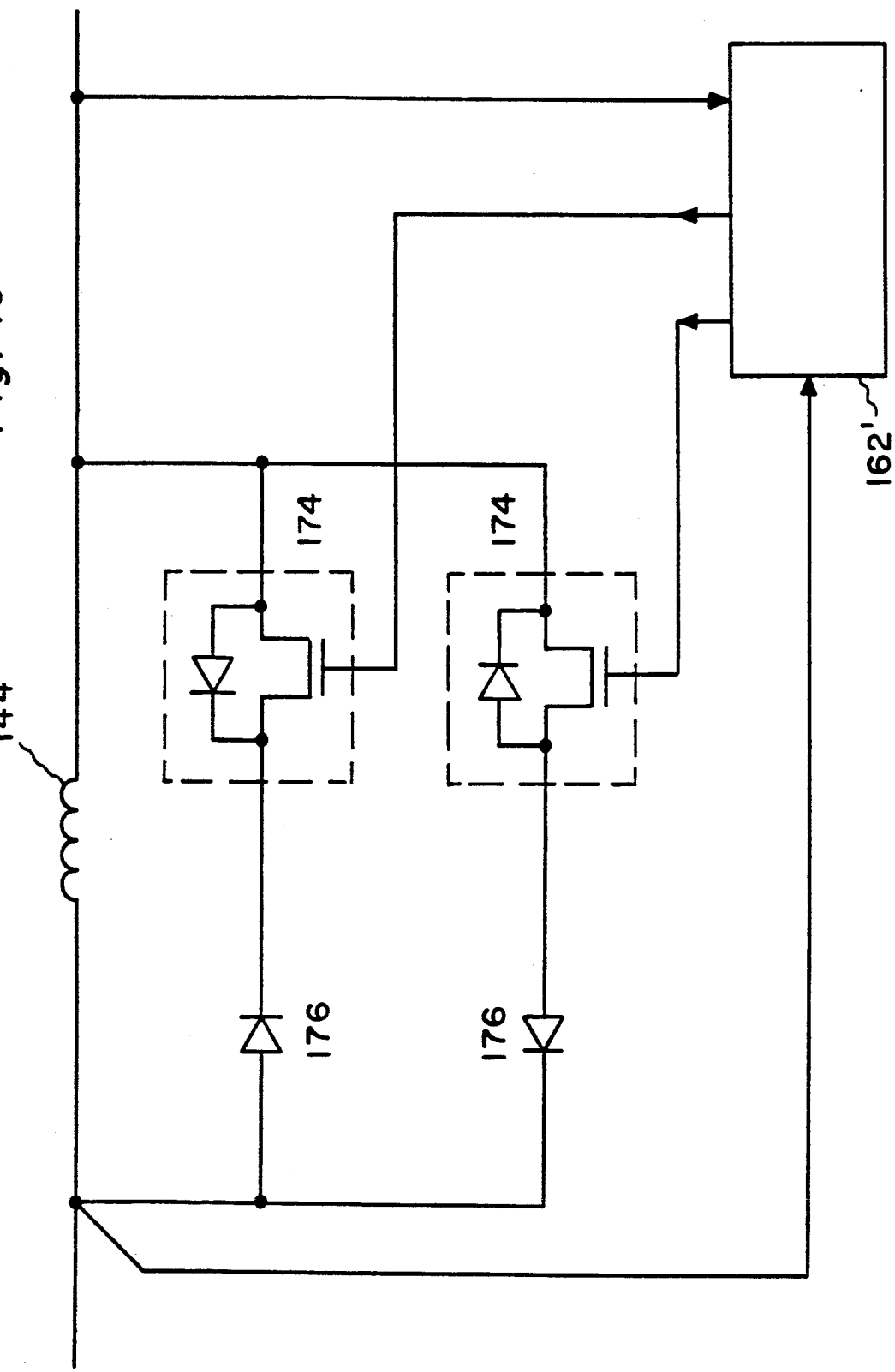
FIG. 15 illustrates a regulation system which combines the switching systems of FIGS. 4 and 10 to provide maximum versatility in regulation.

In FIG. 15, a further alternative switching system 270 is illustrated. This switching system includes two switching devices and requires two control signals and includes the switching system of FIG. 4 connected in parallel with the switching system of FIG. 10. With this switching system, the beneficial aspects of the two switching systems are combined for maximum efficiency and regulation versatility at the cost of providing the second switching device and diode and a more complicated control system which is not only capable of providing the control pulses required for regulation of the output by either of the switching techniques, but also capable of selecting which switching technique to use for a given degree of regulation.

A significant benefit of this regulation structure is the fact that the FIG. 4 system which provides low ripple and high efficiency, may be used for normal steady state regulation while the quick charge system of FIG. 10 may be used to compensate for sudden changes in output power current requirements if a load connected thereto suddenly places an undercharged capacitor thereacross by quickly charging that capacitor, or in response to a sudden change in voltage requirements to provide a quick change in the output voltage by quickly charging the output storage capacitor in the event that a change in output voltage is desired.

Figure 16:
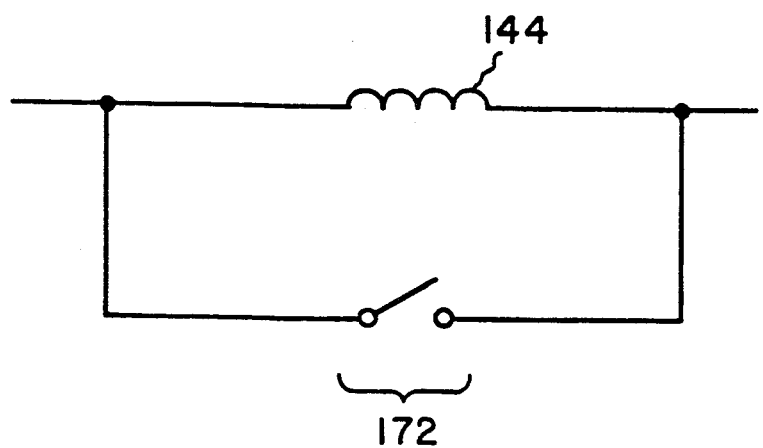
FIG. 16 illustrates a further alternative configuration for the switching system in FIG. 3.

In FIG. 16, a further switching system 370 is illustrated which employs only a single switching device which is a bidirectional switching device in the sense that it can hold off voltage in both polarities and can turn off current in each polarity. Such switching devices include symmetric MOS controlled thyristors (MCTs), four terminal field effect transistors which are free of source-to-body and drain-to-body short circuits and other switching devices. This switching system can be controlled in accordance with the timing of the closing of the switching device to provide regulation in accordance with either the FIG. 4 scheme or the FIG. 10 scheme. However, it carries with it the drawback that because of the absence of the diode connected in series with the switching device, the instant at which switching device turns off becomes critical to prevent reverse current flow through the switching device when the voltage across the inductor changes sign. The accuracy of this turn-off can also have a significant effect on overall system efficiency in the form of switching losses as well as undesired current flow.

Generally, the FIG. 4 ISSPR system is more desirable than the FIG. 10 ISSPR system, unless the system will encounter step load changes, will be required to provide step changes in output voltage. Some systems of this type are pulsed radars, lasers and so forth.

Each of the illustrated embodiments of the present invention employs a full wave rectification system. This regulation system is also effective with half-wave rectification systems However, full wave rectification is preferred because it provides greater efficiency and less ripple on the output than a half wave rectification system does.

The rectifying devices 41 and 42 are illustrated as being diodes, but may preferably be synchronous rectifier devices when maximum system efficiency is desired. Consequently, it will be understood that inductor-shunt, synchronous, post regulation in accordance with the present invention is applicable to any power supply system having an inductor connected in the current path from the rectification system to the output terminal.

The regulating switching device has been illustrated as a FET, but may be an IGBT, a bipolar transistor, a thyristor, including gate turn-off thyristors, MOS controlled thyristors (MCTs). Where a self-commutating switching device such as a thyristor is used, the diode may be omitted without rendering the turn-off control critical, provided that the self-commutating device is sufficiently fast.

A variety of control systems have been illustrated. However, it will be recognized that many other control systems may be used and that, although not preferred, the switching device may be turned ON at a time in the rectified voltage cycle which requires that the switching device be turned OFF while there is voltage across it rather than allowing commutation of the diode to turn off the current in the shunt path.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A power supply, comprising:
an output terminal;
a transformer having a secondary winding for providing an ac input signal;
a rectification system, including at least one rectifying device, connected to said secondary winding for rectifying said ac signal;
an output filter comprising a filter inductor connected in the current path from said rectification system to said output terminal; and
an output voltage regulation system including a regulating switching system connected in parallel with said filter inductor, said regulating switching system comprising a self-commutating switching device and being capable of holding off voltage in both polarities, said output voltage regulation system further including means for providing a turn-ON control signal to said regulating switching system for causing said self-commutating switching device to switch from its non-conductive state to its conductive state, said means for providing a turn-ON control signal being configured to provide said turn-ON control signal during a period when all of said at least one rectifying devices are off.

2. The power supply recited in claim 1 wherein:
said output filter further comprises a capacitor connected between said output terminal and a reference potential.

3. The power supply recited in claim 1 wherein:
said regulating switching system is a bidirectional switching device.

4. The power supply recited in claim 1 wherein:
said secondary winding has first and second ends and a tap, said tap being connected to a reference potential; and
said rectifying system includes first and second rectifying devices respectively connected in the current paths between said first and second ends of said secondary winding and said filter inductor.

5. The power supply recited in claim 1 wherein: said switching device is a regenerative device.

6. A power supply, comprising:
an output terminal;
a transformer having a secondary winding for providing an ac input signal;
a rectification system including at least one rectifying device connected to said secondary winding for rectifying said ac signal;
an output filter comprising a filter inductor connected in the current path from said rectification system to said output terminal; and
an output voltage regulation system including a regulating switching system connected in parallel with said filter inductor, said regulating switching system being capable of holding off voltage in both polarities, said regulating switching system comprising a switching device capable of controlling current conduction in a first polarity and further comprising a diode connected in series with said switching device, said diode being oriented to prevent current flow in said switching device in a second polarity, said switching device being oriented to enable current flow therethrough from the output terminal end of said inductor to the rectification system end of said inductor, said output voltage regulation system further including control means for controlling the turn-ON time of said switching device to occur during a period when all of said at least one rectifying devices are off.

7. The power supply recited in claim 6 wherein said switching device is capable of holding off voltage in only one polarity.

8. The power supply recited in claim 7 wherein:
said switching device is afield effect transistor.

9. The power supply recited in claim 6 wherein:
said switching device is a field effect transistor.

10. A power supply, comprising:
an output terminal;
a transformer having a secondary winding for providing an ac input signal;
a rectification system including at least one rectifying device connected to said secondary winding for rectifying said ac signal;
an output filter comprising a filter inductor connected in the current path from said rectification system to said output terminal, said output filter further comprising a capacitor connected between said output terminal and a reference potential; and
an output voltage regulation system including a regulating switching system connected in parallel with said filter inductor, said regulating switching system being capable of holding off voltage in both polarities, said regulating switching system comprising a switching device capable of controlling current conduction in a first polarity and further comprising a diode connected in series with said switching device, said diode being oriented to prevent current flow in said switching device in a second polarity, said switching device being oriented to enable current flow therethrough from the rectification system end of said inductor to the output terminal end of said inductor, said output voltage regulation system further including control means for controlling the turn-ON time of said switching device to occur when at least one of said rectifying devices is conducting, just prior to the period when all of said at least one rectifying devices are off, thereby rapidly charging the filter capacitor.

11. The power supply recited in claim 10 wherein:
said switching device is afield effect transistor.

12. A power supply, comprising:
an output terminal;
a transformer having a secondary winding for providing an ac input signal;

a rectification system including at least one rectifying device connected to said secondary winding for rectifying said ac signal;
an output filter comprising a filter inductor connected in the current path from said rectification system to said output terminal; and
an output voltage regulation system including a regulating switching system connected in parallel with said filter inductor, said regulating switching system being capable of holding off voltage in both polarities, said output voltage regulation system further including means for providing a switching control signal to said regulating switching system for causing said regulating switching system to switch between its non-conductive and conductive states when all of said at least one rectifying devices are off.

13. The power supply recited in claim 12 wherein said output voltage regulation system includes:
a filter capacitor connected between said output terminal and a reference potential; and
means for sensing the voltage across said filter capacitor.

14. A method of operating a power supply of the type comprising output terminals, a transformer for providing an ac input signal, a full wave rectification system including first and second rectifying devices, said rectification system being connected across said transformer for rectifying said ac signal, an output filter comprising a series connection of a filter inductor and a filter capacitor, said output filter being connected across the output of said rectification system with said filter capacitor connected cross said output terminals, a post rectification output voltage regulation system including a regulating switching device connected in parallel with said filter inductor, said method comprising:
turning said regulating switching device on for a portion of the time period when both of said rectifying devices are off: and
increasing the duration for which said regulating switching device is on to increase the output power.

15. The method recited in claim 14 wherein:
the timing of period when said switching device is on is selected to cause said switching device to conduct current from the filter capacitor end of said filter inductor to the rectifier endof said inductor.

16. The method recited in claim 14 including:
initiating current flow in said regulating first polarity; and
stopping current flow in said regulating switching device by commutation when the polarity of the voltage across said inductor reverses.

* * * * *